United States Patent [19]

Nichols et al.

[11] Patent Number: 4,853,839

[45] Date of Patent: Aug. 1, 1989

[54] ANTENNA POSITION TRACKING APPARATUS AND METHODS

[75] Inventors: Steven R. Nichols, Duluth; Robert C. Hyers, Tucker; Walter M. Stovall, Atlanta; Charles D. Trawick, Doraville, all of Ga.

[73] Assignee: Scientific-Atlanta, Inc., Atlanta, Ga.

[21] Appl. No.: 251,665

[22] Filed: Sep. 29, 1988

Related U.S. Application Data

[63] Continuation of Ser. No. 782,553, Oct. 1, 1985, abandoned.

[51] Int. Cl.⁴ .................. G05B 15/02; G05D 3/20
[52] U.S. Cl. .................. 364/167.01; 341/116; 342/75; 342/359; 364/559
[58] Field of Search .......... 364/516, 520, 559, 167.01; 341/116, 167; 342/74, 75, 80, 359; 340/995

[56] References Cited

U.S. PATENT DOCUMENTS

| | | | |
|---|---|---|---|
| 3,749,893 | 7/1973 | Hileman | 364/520 |
| 3,924,235 | 12/1975 | Heller et al. | 342/75 |
| 4,018,989 | 4/1977 | Snyder et al. | 364/520 |
| 4,024,533 | 5/1977 | Neumann | 341/167 |
| 4,148,026 | 4/1979 | Gendreu | 342/80 |
| 4,263,539 | 4/1981 | Barton | 342/359 |
| 4,360,889 | 11/1982 | Liedtke | 364/559 |
| 4,449,117 | 5/1984 | Fortescue | 341/116 |
| 4,468,745 | 8/1984 | Kjosavik | 364/559 |
| 4,590,476 | 5/1986 | Burkett | 342/75 |
| 4,665,401 | 5/1987 | Garrard et al. | 342/75 |

OTHER PUBLICATIONS

Brochure by Northern Precision Laboratories, Inc. entitled "A Leader in High Accuracy Antenna Position Encoding and Control Systems".
A brochure by Analog Devices entitled "Hybrid, Tracking Resolver-To-Digital Converters".
Exerpt from *Synchro-Conversion Handbook* by the engineering staff of ILC Data Device Corporation, comprising title page, overleaf, page III and pp. 15–36 (1974).
Excerpts from *Synchro and Resolver Conversion*, edited by Jeffery S. Boyes, Product Marketing Manager of Analog Devices, Inc. comprising title page, overleaf and pp. 43–78 (1980).

*Primary Examiner*—Felix D. Gruber
*Attorney, Agent, or Firm*—Kilpatrick & Cody

[57] ABSTRACT

Apparatus and methods for tracking a positioning system for antennas and other devices. Hardware of the invention contains circuitry which when given velocity information, changes its output position information at a specified rate. The hardware may also be triggered to capture a sample of such output position information to provide feedback to the firmware of the invention, which implements a position tracking algorithm. The algorithm utilizes two consecutive input position samples, the time between those samples and the feedback information corresponding to the last position input sample to calculate the velocity to be applied to the position tracking hardware until a new position input sample is available. When the new sample is available, a new velocity is calculated and applied to the hardware and the process is repeated. Between position input samples, the hardware updates the output position to correspond to the motion of the positioning system. The invention minimizes group delay and allows for more convenient sampling from a remote positioner.

15 Claims, 18 Drawing Sheets

ANTENNA POSITION TRACKING APPARATUS AND METHODS

This is a continuation of copending application Ser. No. 782,553 filed Oct. 1, 1985, now abandoned.

A microfiche appendix is included which contains three pages and 174 fiches.

BACKGROUND AND SUMMARY OF THE INVENTION

This invention relates to apparatus and methods for tracking antenna position. It may be used for microwave, radar or other antennas, on test ranges or other locations.

Conventional synchro- and resolver-to-digital converters receive analog signals from a synchro or resolver and digitize those signals for output. Use of such converters for position measurement can result in group delay, however, comprising primarily time required for the digitizing process and propagation time delay for time of flight between the converter and the instrument to which its signals are supplied. Such propogation time delay becomes especially significant in remote position sampling applications. A conventional solution to minimize time required for the digitizing process has involved constantly supplying analog position signals to such digitizing converters.

Generally, antenna data is acquired by varying position, the independent variable, and measuring the dependent variables at defined position intervals. Many systems use record increments generated by constantly examining the output of a position indicator to determine whether the dependent variables are to be measured. The system controller must recognize the record increment, trigger the instruments, wait on the instruments to settle, gather the data, and acknowledge the record increment to the generating device. An overspeed condition exists when this sequence is not completed before the next record increment occurs.

To minimize system data acquisition time, the time between record increments must be minimized. The time between record increments may be varied by changing positioner speed; however, positioner speed is not usually the limiting factor. In a typical antenna measurement system, for instance, the time between record increments is limited by system controller processing time and record increment detection time. Record increment detection time is the time between the last record increment acknowledged and the next record increment and is affected by the position indicator's digital output update rate and group delay characteristics. The maximum variation in group delay plus the time until the next update is the minimum record increment detection time. A typical position indicator might have 8 ms group delay variation and a 10 ms update rate. For such a case, the minimum record increment detection time is 8–18 ms. If this record increment detection time could be eliminated, it could be subtracted from the time required between record increments increasing data acquisition speed.

Applicant's apparatus is designed to eliminate record increment detection time. Not only does the tracking algorithm provide high speed output update rates, but it also compensates for processing delays to give zero group delay variation at constant position or velocity. With an output update rate of 200 ns and a group delay variation of zero during a constant velocity scan, total record increment detection time is 200 ns. This feature will considerably decrease data acquisition time in many systems.

The present invention samples the antenna position at regular, but varying intervals and predicts the position of the antenna between such samples using an algorithm, unlike previous techniques. This predicted position may be provided for output at more frequent intervals than those at which antenna position is sampled, unlike other techniques which can provide output only as frequently as antenna position is input into the converter. The hardware of the present invention contains circuitry which utilizes velocity related input at predetermined intervals to calculate output position. Additionally, output may be captured to provide feedback for updating the algorithm.

Firmware of the present invention utilizes a tracking algorithm which receives two consecutive position input samples, notes the period of time between such samples and notes feedback information corresponding to the most recent position input sample to calculate the updated velocity to be applied to the position tracking hardware during the interval prior to reception of a new position input sample. When the new sample is received, the process is repeated.

Importantly, the apparatus and methods of the present invention are useful when input samples are taken at a location which is remote from applicant's position tracking hardware and firmware. In such a case, a synchronizing signal is sent over an asynchronous serial link to define the point in time at which the input sample is taken. The synchronizing signal insures that the feedback information received by applicant's apparatus corresponds with the point in time that the input sample is generated at the remote location.

Applicant's firmware accepts position input samples every 15–20 ms. It predicts the velocity over the interval between the current position sample and the next sample, and adds any necessary error correction. This velocity signal is then output to the hardware portion of the apparatus which comprises a counter chain whose value can be captured in a set of output latches. The counter chain is driven by a variable rate clock which, under microprocessor control, changes the value of the counter chain to correspond with the actual position of the axis. When the positioner is moving at a constant speed (such as during data acquisition on an antenna test range), the counter chain "moves" at the same speed, providing a real-time update to the position information. Since positioner motion is simulated, fast output update rates are obtained which are independent of conversion time and processor speed. However, output information from applicants, apparatus is nevertheless under microprocessor control which allows the flexibility of adding offsets to the angle of the position, switching the axis to be output or displayed, changing the range of an axis, or utilizing remote inputs. The preferred embodiment of applicant's position indication apparatus, sometimes herein referred to as the "1885", implements the tracking algorithm by using difference equations. The actual change in position is calculated by subtracting the last position sample from the newest position sample. The position error of the algorithm-simulated information is calculated by subtracting position feedback generated by the algorithm from the newest sample received by the apparatus. Adding these two terms, dividing by the increment of time between the last position sample and the newest position sample and multiplying by a constant determines the value of the velocity signal to be output to the hardware. The simulation circuit in the hardware integrates velocity to provide a position output. This output and the periodic position input are sampled at the same instant in time to determine the position error of the simulator which, at constant positioner velocity, becomes 0.

The equation for calculating new velocity to be applied to the hardware at time n is:

$$V_n = K_a * [(P_{an} - P_{an-1}) + (P_{an} - P_{fn})]/dt_{n-1}.$$

where $V_n$ is the new velocity for time n to n+1, $K_a$ is a constant determined by the hardware, $P_{an}$ is the newest actual position sample taken at time n, $P_{an-1}$ is the last actual position sample taken at time n−1, $P_{fn}$ is the feedback sample at time n and $dt_{n-1}$ is the length of time from n−1 to n.

The hardware provides the position feedback term according to the following formula:

$$P_{fn} = P_{fn-1} + (dt_{n-1} * V_{n-1} * K_b)$$

where $P_{fn-1}$ is the position feedback sample at time n−1, $V_{n-1}$ is the velocity applied from time n−1 to n and $K_b$ is a constant determined by the hardware.

In addition, the hardware provides a position output which is available at any time (within 200 ns) between sample points described by the following equation:

$$P_{on}(t) = P_{fn} + [K_b * V_n * (t - t_n)],$$

where $P_{on}(t)$ is the position output as a function of time for the period from time n to time n+1 and the term $t - t_n$ is the time elapsed since time n (in 200 ns increments).

Applicants' preferred embodiment of a position data processor according to the present invention, sometimes referred to herein as the "1886", multiplexes three axes of input data and transmits serial data to the 1885 Position Indicator. The serial interface, selectable as either RS-232C or RS-449, may be connected to any communications device which can accept one of these formats. Fiber optic links, modems, microwave links, and direct cable connection are all examples of how the 1885 and 1886 might communicate with each other to provide a means for obtaining position information from a remote site.

Applicants' 1886 Position Data Processor also has an auxiliary serial port which can be configured to provide ASCII position information suitable for input to a portable terminal. Such a terminal may, for instance, be carried to a remote position or by service personnel to give an on-site readout of position.

It is therefore an object of the present invention to provide position indication apparatus and methods which allow information output at more frequent intervals than those at which information from the positioning device is sampled.

It is an additional object of the present invention to provide position indication apparatus and methods which minimize group delay and thus provide more accurate information.

It is an additional object of the present invention to provide position indication apparatus and methods which reduce the complexity of position measurement hardware, which do not require continual input for reduction of group delay, and for which group delay is negligible when the positioner is at constant velocity.

It is a further object of the present invention to provide position indication apparatus and methods which accommodate remote positioner information sampling with minimum group delay.

It is a further object of the present invention to provide position indication apparatus and methods with information input sampling circuitry to accommodate multiplexed inputs.

It is a further object of the present invention to provide position indication apparatus and methods for increased flexibility, including adding offsets to positioner angle, switching the positioner axis to be output or displayed, changing the range of a position or axis, and accommodating remote input.

Other objects, features and advantages of the present invention will become apparent with reference to the remainder of the specification, drawings and claims herein.

DETAILED DESCRIPTION OF THE DRAWINGS

1. INTRODUCTION

Figure 1A:
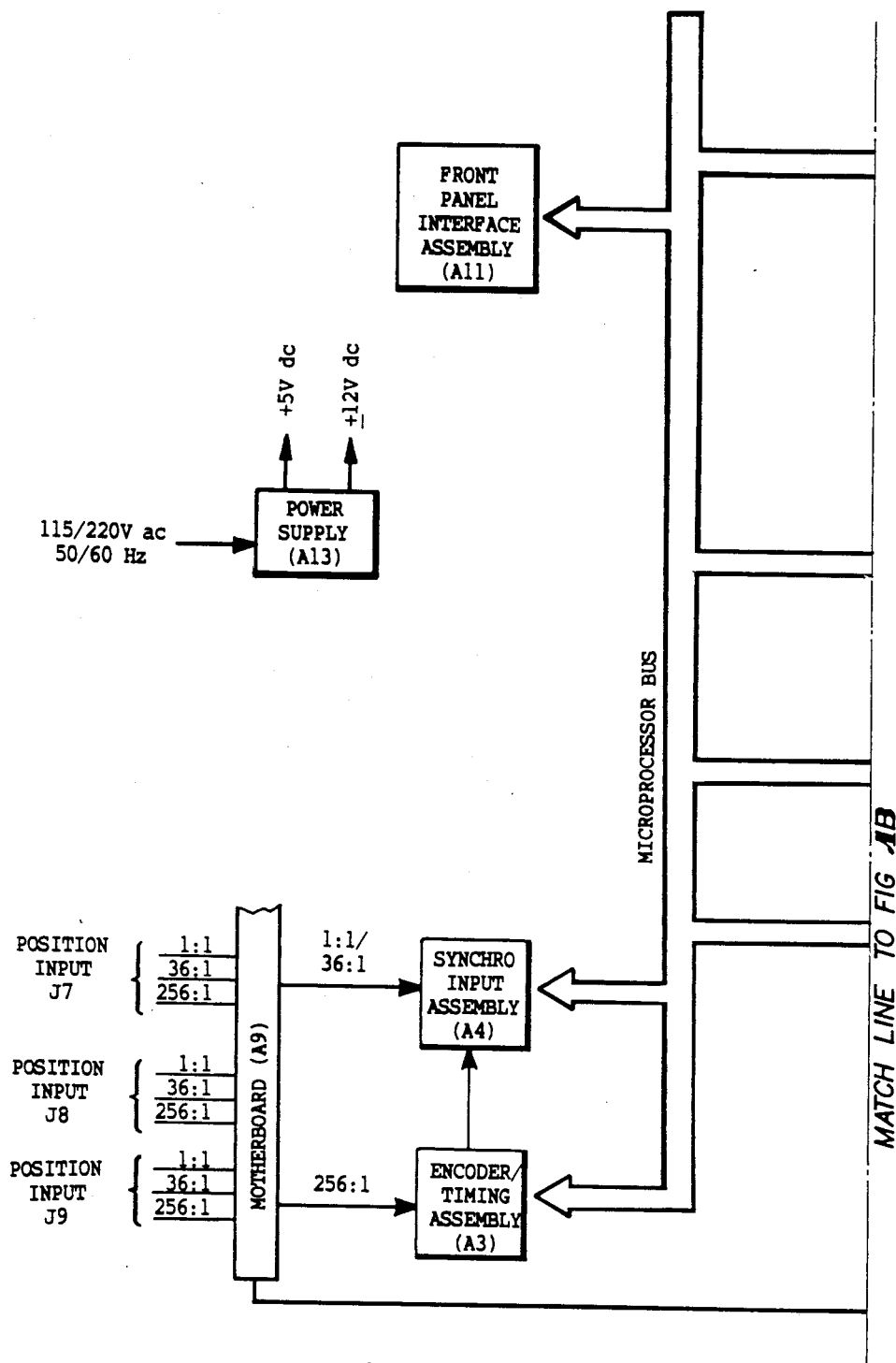
FIGS. 1A and 1B layers together are a block diagram of a preferred embodiment of a position tracking output assembly according to the present invention.

A circuit operation discussion for the 1885 position indicator and the 1886 position data processor embodiments of the invention is provided in this section in two basic sub-sections: a general and a detailed circuit description.

2. GENERAL 2.1 Firmware

The firmware for the 1885 position indicator and the position data processor embodiments of the invention exists in EPROMS located on the CPU assembly. When power is applied to the unit, the 8088 microprocessor resets and begins executing the instructions contained in the EPROMS. The first functions executed initialize the software and the hardware to prepare the unit for operation. With the 1885 position indicator, this includes restoring the set-up parameters saved in non-volatile memory.

In both units, the firmware is "interrupt-driven". In other words, the unit remains in an idle loop until an interrupt occurs. When an interrupt occurs, the unit performs the appropriate task to respond to the particular event which caused the interrupt. The idle loop task triggers the watchdog timer to prevent a reset of the CPU. If the idle loop is not run (an overload condition), the timer resets the CPU causing the power-up sequence to run again. Encoder data ready, synchro data ready, and serial I/O interrupts occur in both the 1885 position indicator and 1886 position data processor. The 1886 position data processor has an additional interrupt associated with the serial interface. The 1885 position indicator has two additional interrupts - one for GPIB I/O and one for record increments.

Encoder data ready and synchro data ready interrupts occur at line frequency and indicate that a new set of position data is available. The respective inputs are read and stored in separate axis structures according to the definitions provided by the user in set-up mode. The input data are converted only when needed for some type of display or output (such as front panel, GPIB, tracking output, or serial output). The inputs are converted to 32-bit binary fraction of a circle format which is used internally. If another format is needed for output (such as with GPIB) operation), the binary fraction of circle is converted to the desired format.

The serial interface is used primarily to transfer data from the 1886 position data processor to the 1885 position indicator. The 1886 position data processor reads and converts encoder and synchro information for its three inputs and transmits it to the 1885 position indicator over the serial link. The 1885 position indicator receives these three positions and saves them in the axis structures defined by the user in set-up mode.

The tracking algorithm uses the local or remote inputs to control the position tracking/output hardware. The program computes a velocity based on the change in input position over time and the differences between the input position and the output position. This velocity is applied to the hardware which changes the position at the specified rate.

The front panel interface runs on a timed basis to sense the switch "presses and releases" and update the displays. The position information displayed may originate locally or remotely. Front panel operation is described in greater detail in Section 3.7.

The GPIB interface driver firmware receives an interrupt whenever bus servicing is required (such as byte input, output, and control signals). The firmware saves the data in an input buffer until a valid delimiter is received at which time the data are transferred to a command processor. This command processor performs whatever actions are necessary as a result of the information received over the GPIB. If an output message is necessary, the command processor sends the message to the driver firmware, which in turn sends the message over the bus through the GPIB hardware at the proper time. Since the output buffer is of finite length, it must be read by the system controller before it becomes full.

In practice, when the system controller asks for data from the 1885 position indicator, it must allow the 1885 position indicator to talk over the bus before requesting more data.

The axis select function is also controlled by the firmware. It reads the axis select input to determine which is the selected axis.

Non-volatile memory, contained in the 1885 position indicator remembers all set-up and configuration information. This memory is updated once per second to keep up-to-date information. When power is removed from the unit, the hardware retains the information stored. When power is reapplied (if the contents of NV memory are valid, verified through a cyclic redundancy check), the stored information is used to restore the instrument to its pre-power loss state. If an error is detected in non-volatile memory, the unit resets and set-up information is lost.

1886 position data processor operation is very similar to the 1885 position indicator operation except the 1886 position data processor has no tracking outputs, front panel display, GPIB interface, axis select I/O, or non-volatile memory. The 1886 position data processor primarily performs synchro and encoder input and conversion, and transmits the data serially to the 1885 position indicator as previously described.

2.2 Axis Definition

Definitions for axes A through F must correspond with the actual system configuration. Each axis has specific information which it is assigned to in set-up mode (or over the GPIB). This information (the angular/linear flag, the input source, the input type, and the label) is all associated with each axis called A, B, C, D, E, or F. By allowing the user to define these axes, many different system configurations are possible.

2.3 Serial Interface Considerations

Some additional considerations are necessary when using the serial interface with a modem or any other means of transmission besides a direct cable. Even though Request to Send and Clear to Send signals are provided, the 1886 position data processor must always be allowed to send data whenever it is ready. If Clear to Send is ever false, the possibility exists for an error. However, the 1885 position indicator does not have this same constraint.

Another consideration is group delay through the transmission medium. The 1885 position indicator assumes zero group delay and will not correct for constant or variable group delay which may exist in the link (group delay in this situation is defined as the time between when an 1886 position data processor bit transition occurs and when the corresponding bit transition arrives at the 1885 position indicator). Any delays produce a position lag equal to the group delay multiplied by the the positioner speed. This lag will be seen as a dynamic error in the system. If the group delay is constant and the positioner speed is constant, a constant position offset will occur which will affect not only accuracy, but may affect system data acquisition speed. For example, a constant group delay of 10 milliseconds and a positioner speed of 1 RPM produces a position offset of 0.060 degrees.

2.4 Position Tracking

Before discussing the hardware details of the 1885 position indicator and 1886 position data processor, this section provides a functional explanation of the "heart" of the indicator's operation—position tracking. Most position indicator units simply accept, process, and output position data providing no compensation for the time lag due to delays in signal processing. This phenomenon causes inaccurate and/or obsolete position data to be shown on the display as compared to the actual status of the positioner. The 1885 position indicator, however, uses a position tracking algorithm to accurately simulate positioner movement. In this manner, position display data is always up-to-date and simultaneous with actual positioner movement. Tracking is particularly helpful in remote systems where a serial link couples the display unit to the optional 1886 position data processor, potentially adding delays in position data processing.

Figure 1B:
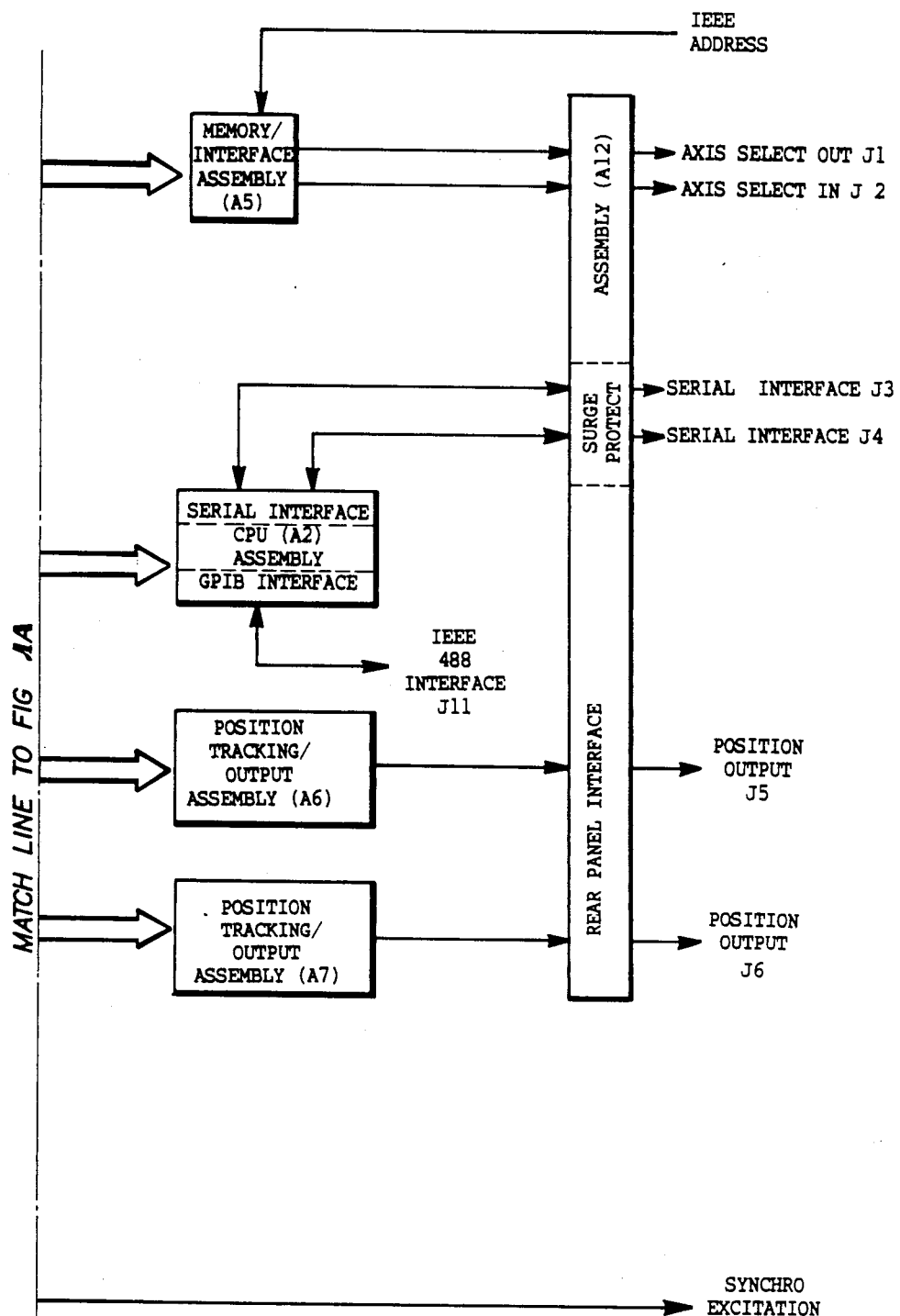

The internal circuit primarily responsible for simulating position display data is the Position Tracking/Output circuit, controlled by the 8088 microprocessor (FIG. 1). The tracking process is based on the assumption that velocity will be constant during the succeeding measurement periods and equal in value to the previous period. First, the microprocessor samples positions at the beginning and end of a time period and determines the overall tracking velocity. The microprocessor adjusts this velocity value to correct for any position error already present in the tracking model, and sends the result to the Position Tracking/Output assembly. The position data for output are then changed and corrected accordingly over the next sample period. Tracking velocity for a succeeding period is calculated as shown here:

$$V_{Tn,n+1} = V_p P_e / dt$$

where:
$V_{Tn,n+1}$ = tracking velocity for the period from ndt to (n+1)dt
$V_p$ = calculated positioner velocity
$P_e$ = position error at end of period
$dt$ = length of time period
Therefore:

$$V_{Tn,n+1} = (P_n - P_{n-1})/dt - (P_{sn} - P_n)/dt$$

where:
$P_n$ = last sample point of the period
$P_{n-1}$ = original sample point of the period
$P_{sn}$ = simulated position For the sake of simplifying this discussion, a somewhat hypothetical example of how the 1885 position indicator performs delay compensation is first presented. Afterwards, an example closer to actual operating conditions is presented.

Figure 2:
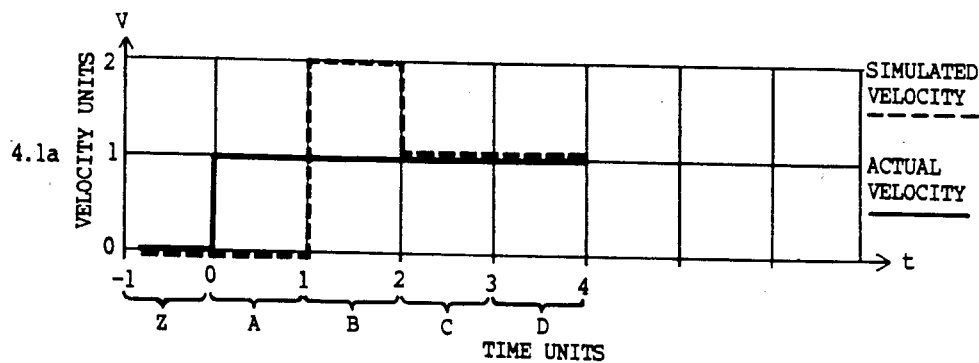
FIG. 2 is a diagram illustrating time delay compensation of the assembly of FIG. 1.
Figure 2:
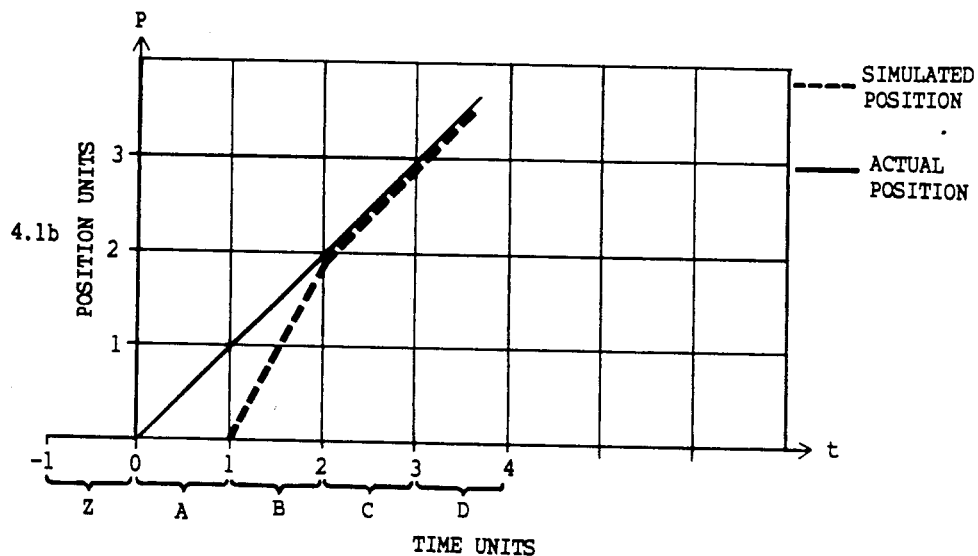

Refer to the graph in FIG. 2 and to the related data in Table 1. The two major components in calculating velocity, position and time, are plotted with position units on the vertical axis and time units on the horizontal axis. The solid lines represent actual position and velocity while the dashed lines represent simulated position and velocity. Note the velocity as shown in FIG. 2. During the initial start-up period of the system (period Z), the positioner is at zero velocity. At time=0, the actual velocity changes abruptly to a value of "1" and remains at this velocity throughout the remaining periods.

TABLE 1

| PERIOD | AVERAGE POSITIONER VELOCITY | SIMULATED VELOCITY | POSITION ERROR AT END OF PERIOD | CALCULATED TRACKING VELOCITY APPLIED TO THE NEXT PERIOD |
|---|---|---|---|---|
| Z | 0 | 0 | 0 | 0 |
| A | 1 | 0 | −1 | 2 |
| B | 1 | 2 | 0 | 1 |
| C | 1 | 1 | 0 | 1 |
| D | 1 | 1 | 0 | 1 |

As FIG. 2 shows for period Z, assume the initial simulated velocity is zero, meaning the simulated velocity equals actual velocity. The microprocessor takes the beginning and ending points in period Z and calculates a tracking velocity of "zero" for the next period (or A) as indicated in two columns of the chart in Table 1. (Note the value underneath the heading Calculated Tracking Velocity Applied to the Next Period of one period becomes the Simulated Velocity of the next period). However, as indicated on the graph, the actual velocity of the positioner during period A is not zero. Instead, it has changed to "1". This means the assumption made previously by the Position Tracking/Output simulator circuit (that the tracking velocity would be zero during period A) is incorrect resulting in a position error of −1 by the end of the period. Correction and compensation of this error is now necessary in order to have accurate position display/output data. This is accomplished by the microprocessor calculating a corrected tracking velocity.

The actual tracking compensation value is calculated during period A and implemented during period B as indicated by the dashed line in FIG. 2. The tracking velocity calculation made in period A (for period B) is shown in the following expression:

$$V_{Tn,n+1} = (P_n - P_{n-1})/dt - (P_{sn} - P_n)/dt$$
$$V_{T1,2} = (P_1 - P_0)/dt - (P_{s1} - P_1)/dt$$
$$V_{T1,2} = (1 - 0)/1 - (0 - 1)/1$$
$$V_{T1,2} = 1 - (-1)$$
$$V_{T1,2} = 2$$

Therefore in period B, the Simulated Velocity must increase by twice the velocity error to "catch-up" and reduce the position error to zero by period C. The error continues to be zero throughout the remaining periods of this example because the velocity of the positioner remains constant.

Figure 3:
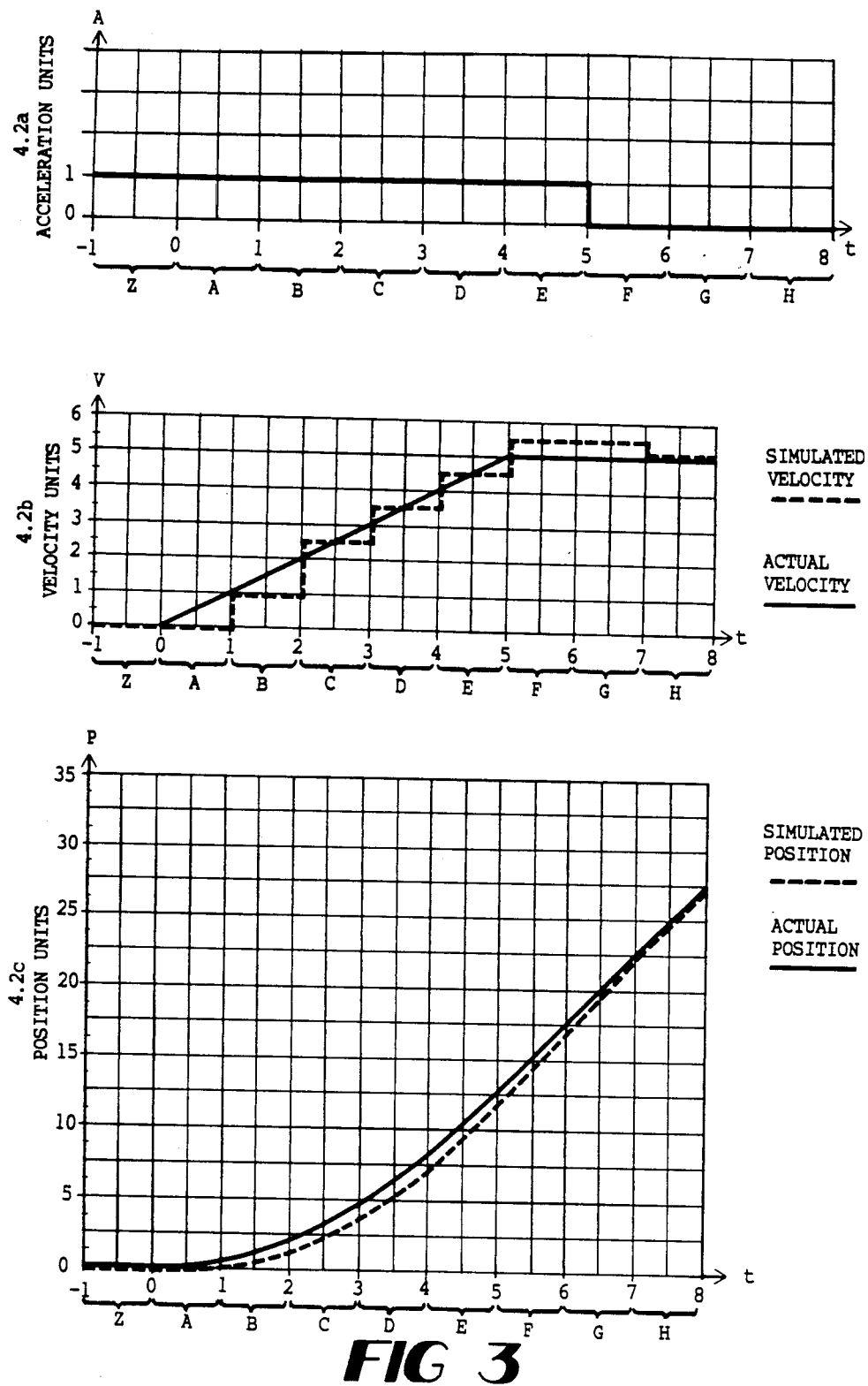
FIG. 3 is a graph of the time delay compensation of the assembly of FIG. 1 under constant acceleration and velocity.

The graphs in FIG. 3 show a more realistic example of tracking error correction. In this case, constant velocity follows constant acceleration. At point zero, the positioner is not active, as indicated by "zero" values for position and velocity. Immediately following point zero, the positioner begins moving at a constant acceleration while the velocity increases linearly. When acceleration decreases to zero (at t=5), the velocity becomes a constant (5 velocity units). Meanwhile, positioner position begins a slow ascent up to t=5 where it becomes linear. Note in FIG. 3 that it takes two full periods after reaching constant velocity (from t=5 to t=7)

before the simulated position "catches-up" to the actual position.

The tracking velocity ($V_t$) necessary to correct errors is calculated using the the same equations expressed in the first example. The calculation in period A (for period B) for this example is shown below. The calculated results of periods B through H appear in Table 2.

Period A:

$$V_{Tn,n+1} = (P_n - P_{n-1})/dt - (P_{sn} - P_n)/dt$$
$$V_{T1,2} = (P_1 - P_0)/dt - (P_{s1} - P_1)/dt$$
$$V_{T1,2} = (.5 - 0)/1 - (0 - .5)/1$$
$$V_{T1,2} = .5 - (-.5) = 1 \text{ position unit per time unit}$$

TABLE 2

| PERIOD | AVERAGE POSITIONER VELOCITY | SIMULATED VELOCITY | POSITION ERROR AT END OF PERIOD | CALCULATED TRACKING VELOCITY APPLIED TO THE NEXT PERIOD |
|---|---|---|---|---|
| A | .5 | 0 | −.5 | 1 |
| B | 1.5 | 1 | −1 | 2.5 |
| C | 2.5 | 2.5 | −1 | 3.5 |
| D | 3.5 | 3.5 | −1 | 4.5 |
| E | 4.5 | 4.5 | −1 | 5.5 |
| F | 5 | 5.5 | −.5 | 5.5 |
| G | 5 | 5.5 | 0 | 5 |
| H | 5 | 5 | 0 | 5 |

By observing the graphs in FIG. 3 and the data in Table 2, two conclusions result: (1) the position error lag remains nearly constant during sampling periods of constant acceleration; and (2) after reaching constant velocity, tracking error compensation requires two full sampling periods before the simulated position tracks in an identical manner to the actual position.

The periods following t=7 will remain error-free as long as the velocity remains constant. In most cases, this means significant error correction will not occur again until deceleration of the positioner.

2.5 1885 Position Indicator Block Diagram Explanation

The following discussion refers to the 1885 position indicator block diagram provided in FIG. 1.

The 1885 position indicator is capable of processing and displaying single speed (1:1), dual speed (1:1 and 36:1) and/or precision dual speed (1:1, 256:1) position transducer data. The CPU (central processing unit) assembly (A2) controls operation of the 1885 position indicator. In addition to an 8088 microprocessor and bus interface, the CPU assembly includes a Serial Interface and a GPIB (General Purpose Interface Bus) interface. All other 1885 position indicator assemblies interface to the CPU Assembly to either accent control commands from the microprocessor, or provide information to the microprocessor.

The 1885 position indicator processes position data through multiple operations of the CPU assembly. The CPU accepts data from the output of position transducers and determines the actual or "absolute" positioner angle. The angle value is stored in the CPU until required by the Front Panel Interface Assembly and/or IEEE Interface. At the same time, the CPU also accepts feedback data from both Position Tracking/Output assemblies (one assembly for each Position Output) to compute velocity values.

Position data from either synchro or encoder position transducers enter the 1885 position indicator by two possible methods: directly at the Position Inputs (J7, J8 and J9), or indirectly through a remote 1886 position data processor at the Serial Interface inputs (J3 and J4). Position data from the output of synchros (1:1, 36:1) are analog in nature. As this analog output data reaches the Synchro Input assembly (A4), an A/D (analog-to-digital) conversion takes place. Encoder data (256:1), however, arrives at the 1885 position indicator previously converted to digital format by the Encoder Processor mounted inside the positioner. The Encoder/Timing assembly (A3) synchronizes the precise triggering of "take-sample" commands for the Synchro Input assembly, the Position Tracking/Output assemblies and the Encoder Processor. After the Synchro Input assembly receives a triggering pulse from the Encoder/Timing assembly, it samples, holds, converts the analog data to a digital format, and notifies the microprocessor that new "absolute" position data are available for reading.

The Serial Interface inputs (J3 and J4) accept position data from a remote 1886 position data processor through a serial link. In addition, certain control data are sent to the 1886 position data processor from the 1885 position indicator over this serial link. A surge protection circuit on the Rear Panel Interface assembly (A12) acts as secondary input protection helping to prevent damage to the CPU and other sensitive circuitry in case lightning strikes near the outdoor serial link cable. Primary protection should be provided by using external computer line protection devices such as a General Semiconductor Industries, Model CDP 42.

Regardless of the input path, the absolute position data are fed to the CPU. Here the data are processed further and distributed to the front panel displays, GPIB Interface and the Position Tracking/Output assemblies.

The IEEE-488 interface input (J11) connects to the GPIB interface on the CPU assembly to allow manipulation of the front panel control functions (including Set-up mode) by an external system controller. The IEEE interface may also be used to gather position data.

The Front Panel Interface assembly (A12) interfaces the front panel display and pushbutton switches to the CPU. During manual operation, the CPU sends display data to the front panel and also receives switch data from the front panel. This process controls the operating characteristics of the 1885 position indicator. Data updates for front panel occur every 1/5th second.

The Memory/Interface assembly (A5) provides these circuit functions:
  o The Axis Select input/output and buffers
  o IEEE address switch reading
  o Non-Volatile Memory
  o Tracking Timers Axis Select data to/from an axis select unit are buffered through latched buffers on the Memory/Interface assembly. During power-up, the CPU reads the rear panel IEEE address switch to determine proper bus operation. Non-Volatile memory provides storage of set-up mode data of up to 2K bytes. Two tracking timers, one for each Position Tracking/Output assembly, measure the time interval between position samples. These timers trigger simultaneously with the position feedback latches on the Position Tracking/Output assembly and with the input data sample.

The 1885 position indicator power supply, manufactured by Standard Power, Inc., provides +5 v and 12 v dc from either v and 220 v ac, 50/60 Hz to various circuit locations.

2.6 1886 Position Data Processor Block Diagram

The position data processor operates as a remote unit for the position indicator by multiplexing up to three axes of single, dual, and/or precision-dual speed data. The assemblies used in the 1886 position data processor are identical to several of the assemblies used in the 1885 position indicator. A block diagram of the 1886 position data processor appears in FIG. 4.

Figure 4:
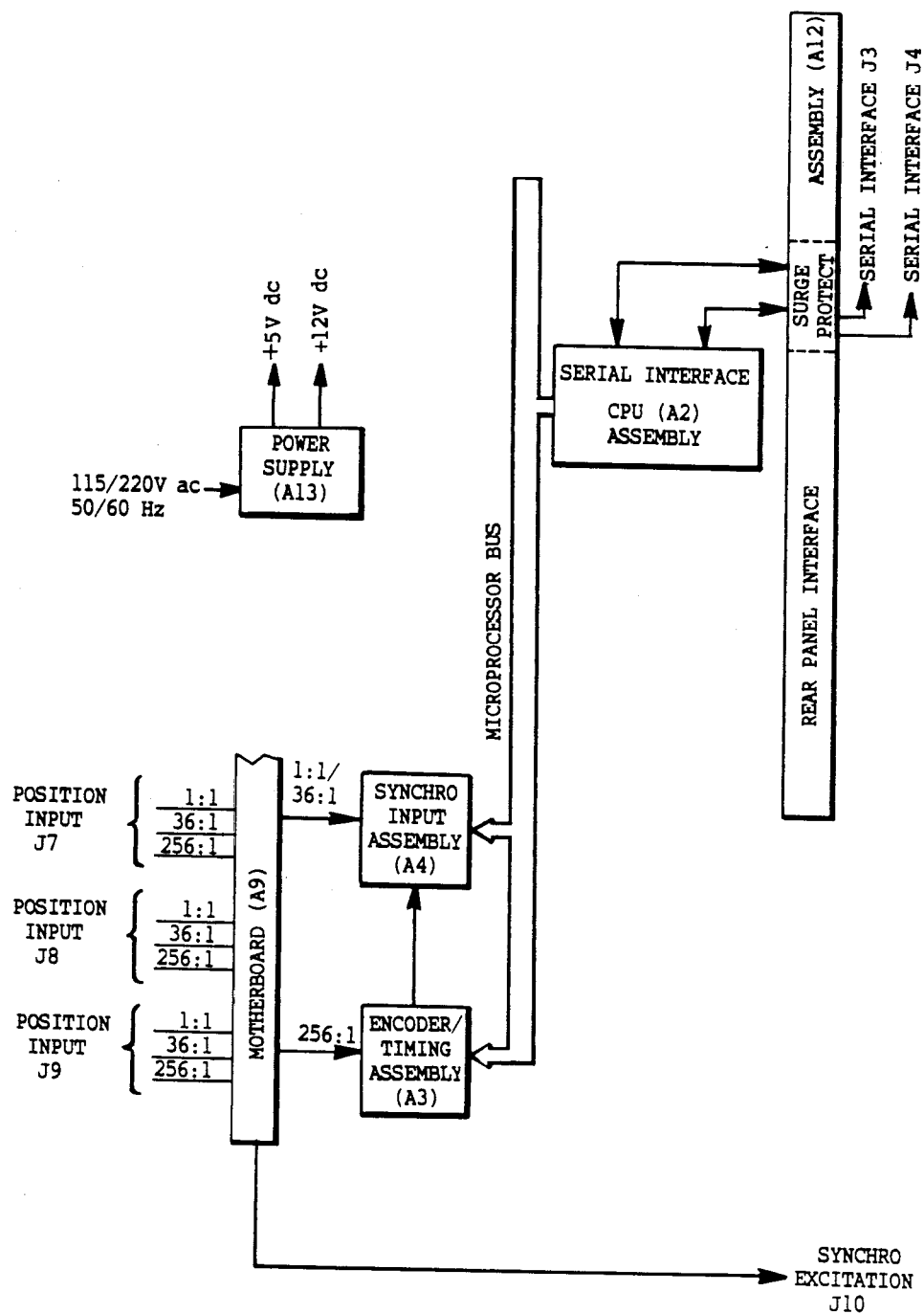
FIG. 4 is a block diagram of a preferred embodiment of a position data processor according to the present invention.

The 1886 position data processor consists of the following assemblies as shown in FIG. 4:
- CPU Assembly (A2)
- Encoder/Timing Assembly (A3)
- Synchro Input Assembly (A4)
- Motherboard Assembly (A9)
- Rear Panel Interface Assembly (A12)
- Power Supply Assembly (A13)

3. DETAILED DESCRIPTION 3.1 Motherboard Assembly (A9)

3.1.1 Detailed Discussion

Figure 5A:
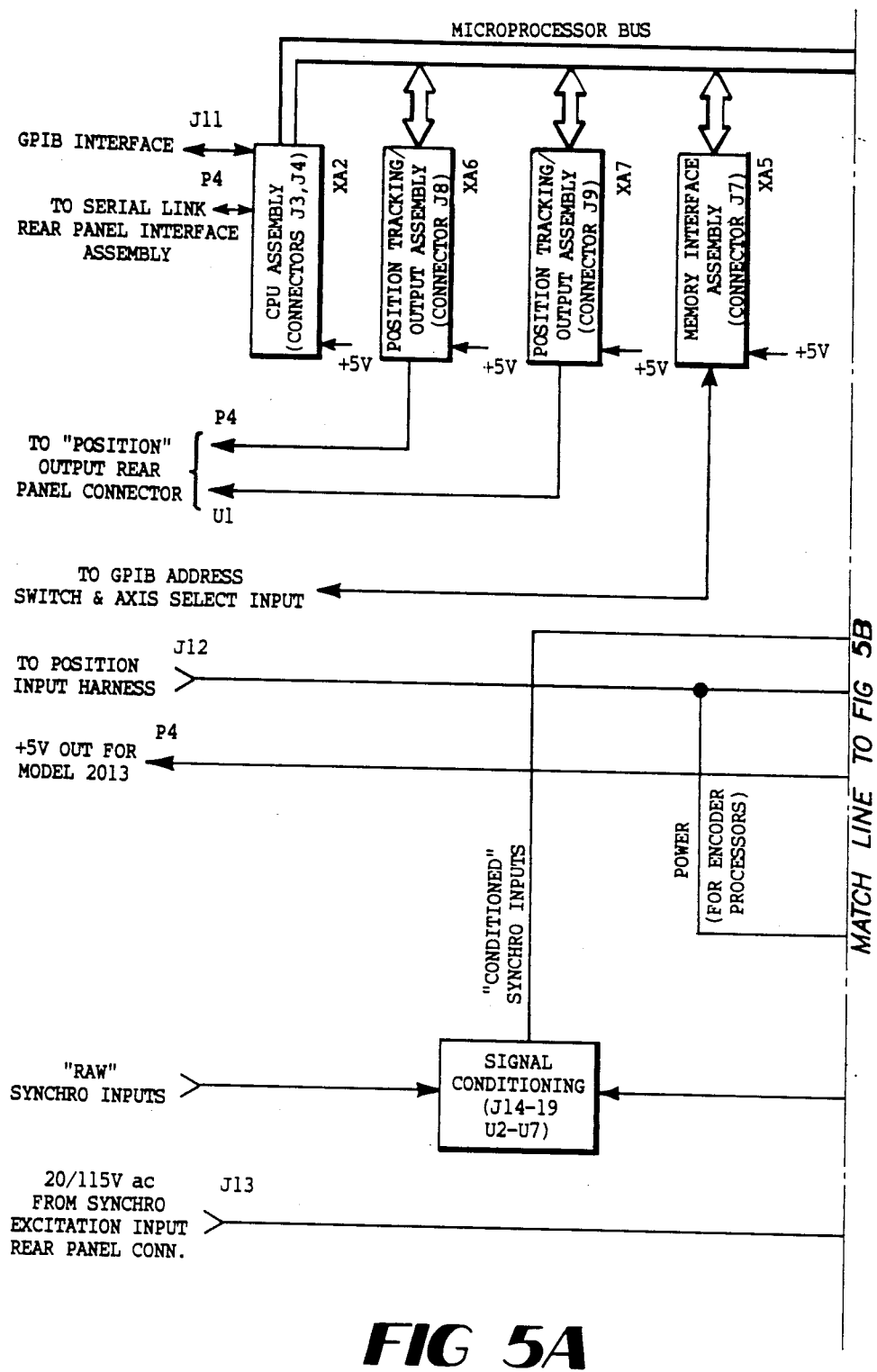
FIG. 5A and 5B are a block diagram of the motherboard assembly of the assembly of FIG. 1.
Figure 5B:
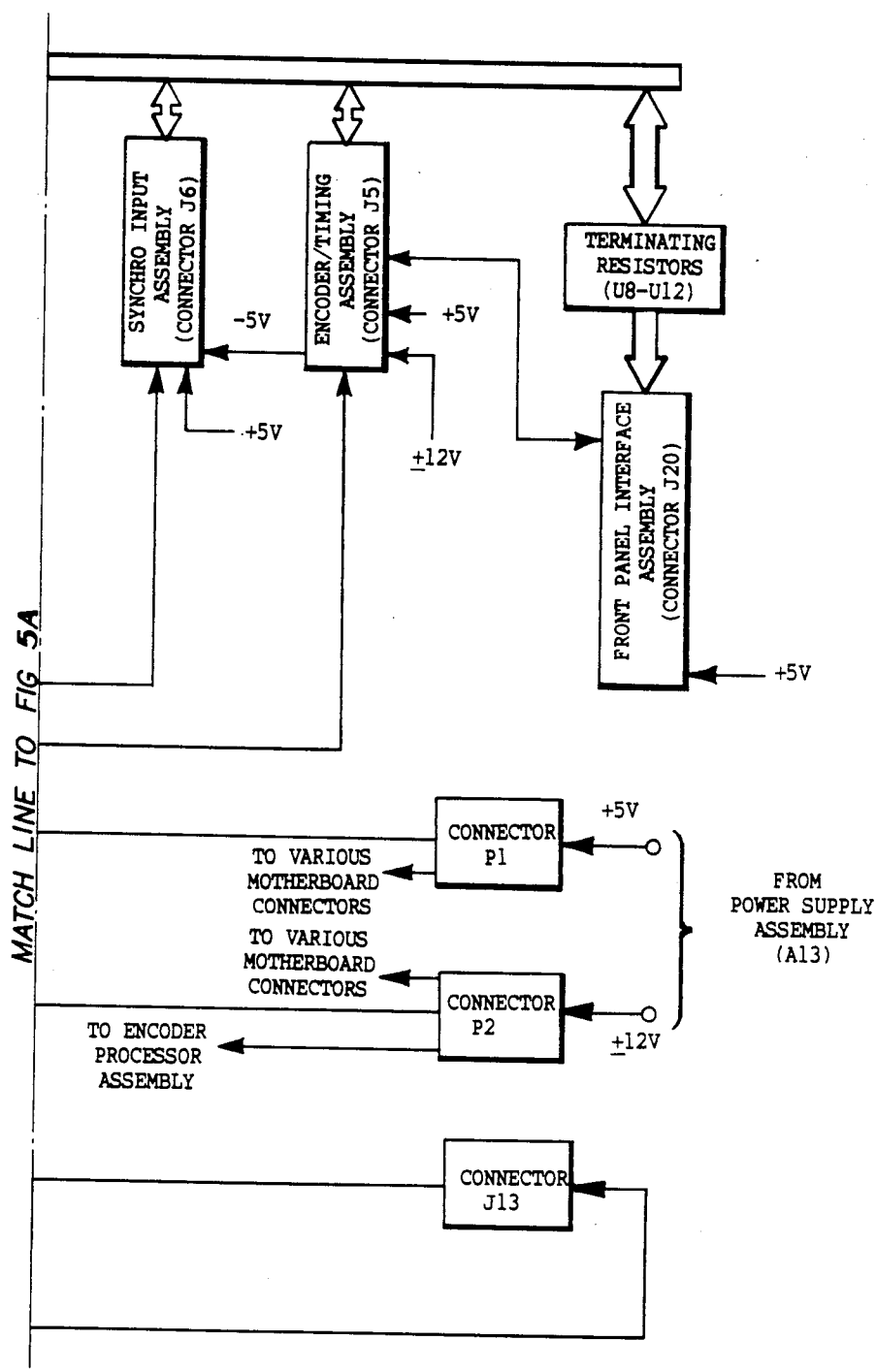

The Motherboard assembly, in addition to performing general interfacing duties, also provides these functions:
- Microprocessor Bus interface
- External connection
- Power distribution
- Signal conditioning A block diagram of the Motherboard assembly appears in FIG. 5

Primary interfacing for the 1885 position indicator assemblies is through the Motherboard assembly. A list of each assembly with corresponding Motherboard connector designations appear in Table 3.

TABLE 3

| NO. | ASSEMBLY NAME | CONNECTOR(S) | SLOT |
|---|---|---|---|
| | Motherboard Connectors | | |
| XA2 | CPU | J3 and J4 | |
| XA3 | Encoder/Timing | J5 | |
| XA4 | Synchro Input | J6 | |
| XA5 | Memory Interface | J7 | |
| XA6 | Position Output/Tracking | J8 | |
| XA7 | Position Output/Tracking | J9 | |
| | Front Panel Interface | J20 | — |
| | Power Supply | P1, P2, and P3 | — |
| | Rear panel Interface | P4 | |

The 8088 microprocessor bus (data bus, address bus, and control bus), originating from the CPU Assembly (A2), interfaces to the Front Panel Interface, Encoder/Timing, Synchro Input, Interface/Memory, and Position Tracking/Output assemblies through Motherboard connectors J3 and J4. (FIG. 5) Terminating resistor networks reduce ringing on high speed bus signals.

The CPU assembly also provides IEEE-488 (or GPIB) interface signals, routed by way of the Motherboard to connector J11. J11 extends through the rear panel of the 1885 position indicator for external access. Switch U1, mounted next to J11 and also accessible through the rear panel, is set to determine the IEEE-488 Bus address of the 1885 position indicator. The Memory/Interface assembly (A5) reads this address by way of the Motherboard.

Axis Select signals, Serial Interface signals, and Position Output data all tie to the Motherboard by way of P4. P4 connects to the Rear Panel assembly (A12). Axis Select signals go to the Memory/Interface assembly (A5), Serial Interface signals go to the CPU assembly (A2), and Position Output data originates on the two Position Tracking/Output assemblies (A6 and A7).

The Motherboard also distributes power to the respective assemblies. +5 v enters the Motherboard through P1, while 12 v enters through P2. Capacitors decouple the +5 v. The Motherboard also routes power to external users; +12 v and +5 v to the Synchro Select unit if present, and 12 v to any Encoder Processor assemblies used.

Low voltage synchro excitation (20 vac) also routes through the Motherboard. Entering at P3, it goes through fuse F3 and on to the synchro harness by way of J17, J18, and J19. High voltage synchro excitation can be routed by the user either directly to the synchros or through the 1885 position indicator. In the latter case, the excitation enters the Motherboard through J13, through fuses F1 and F2, and enters the synchro harness through J14, J15, and J16.

All of these voltage outputs are protected by fuses to prevent damage due to external shorts.

Synchro input signals enter the Motherboard 1885 through connectors J14, J15, and J16 (high voltage synchros), or through J17, J18, and J19 (low voltage synchros). Shorting plugs, installed in the unused connectors, provide proper signal conditioning. Resistor networks process the synchro inputs for compatibility with the Synchro Input assembly (A4) input requirements.

In the 1886 position data processor, connector J21 provides power to the front panel POWER ON LED.

3.2 CPU Assembly (A2)

3.2.1 Overview

Figure 6:
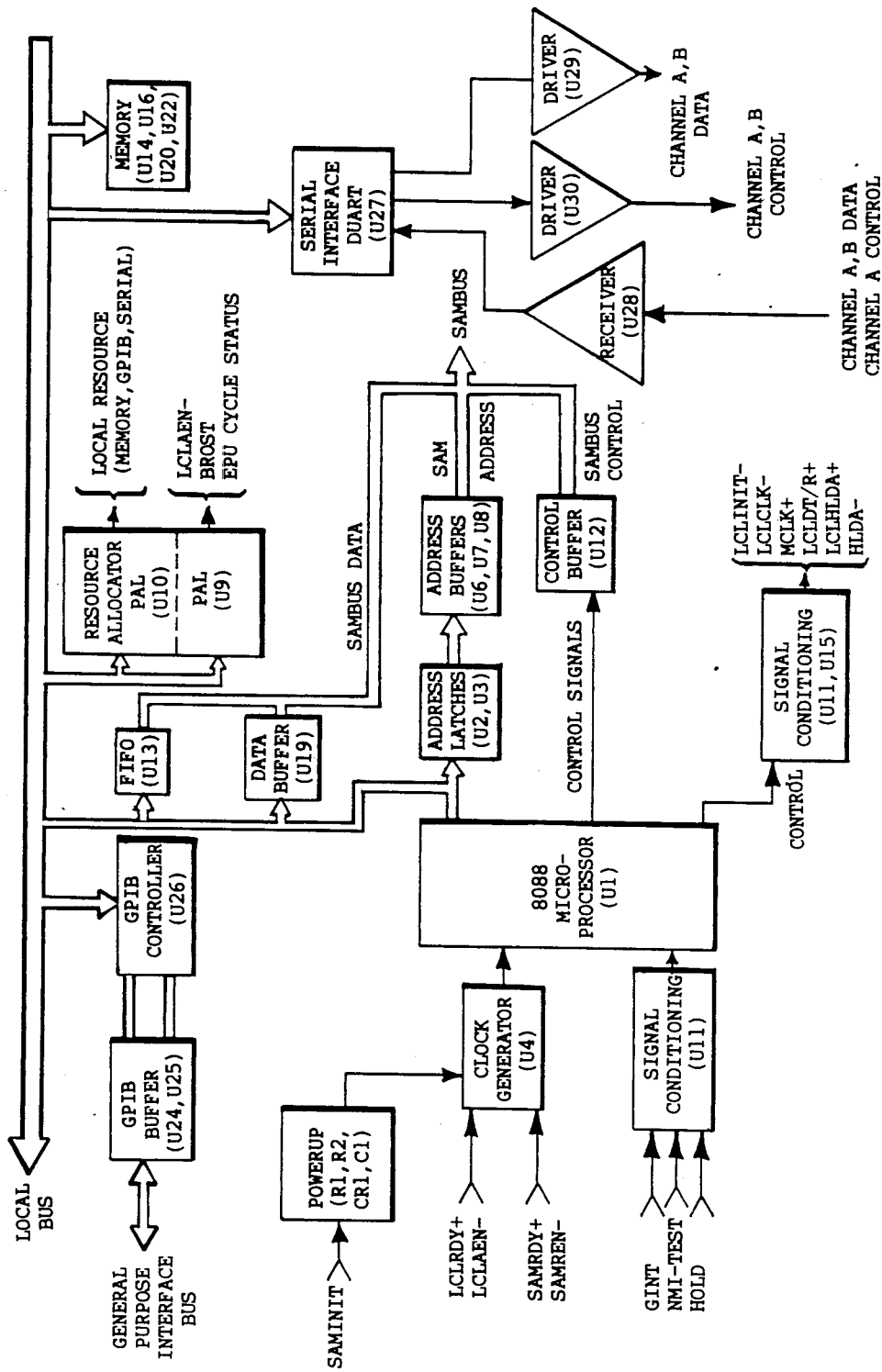
FIG. 6 is a block diagram of the central processing unit assembly of the assembly of FIG. 1.

The CPU assembly consists of the following functions/stages:
- 8088 processing unit
- Resource decode circuitry
- User-configurable memory
- GPIB interface
- RS-232C/423 serial interface
- SAMBUS interface A block diagram of the CPU assembly appears in FIG. 6.

3.2.2 Detailed Discussion

The CPU assembly interfaces to other 1885 position indicator/1886 position data processor printed circuit board assemblies over a multiplexed bus structure through connectors J3 and J4 to Motherboard socket XA2.

A clock generator U4 provides a 5 MHz clock signal, a RESET signal, and a READY signal for supporting operation of the 8088 microprocessor IC (U1). On initial powerup, U4 provides a synchronized reset pulse. At pin 2 of U4, a peripheral clock (PCLK) output of 2.5 MHz is provided for scan operation of the front panel keyboard and display.

The 8088 microprocessor IC U1 uses a 16-bit internal architecture and an 8-bit external data bus structure. U1 also provides a 20-bit address structure for supporting 1 megabyte of "directly-accessible" memory space. On the falling edge of control line signal ADDRESS LATCH ENABLE (or ALE at U1, pin 25), address latches U2 and U3 "capture" address signals A0–A7 and A16–A19. Address signals A8 through A15 are not multiplexed, and therefore are not latched. The outputs of U2 and U3 form the buffered address LCLA0/ through LCLA19.

Signal conditioning circuitry (U11, U15) provides the logic "glue" for the 8088 microprocessor. This includes providing the proper logic level and sense for 8088 inputs (GINT, NMI, TEST, HOLD), 8088 outputs (DT/R, HLDA), and timing signals (LCLCLK, MCLK, LCLINIT).

Programs for executing the unit algorithms are stored in the user-configurable memory, U16, U20, and U22. Each of these devices are 32K by 8 Erasable Programmable Read Only Memory (EPROM) IC chips. The memory capacity of these devices totals 96K bytes. Random Access Memory (RAM) is contained in U14, an 8K by 8 RAM IC chip.

U9, U10, and related components form a "resource allocator" to ease allocating resources both on and off the CPU assembly. This circuit allocates the following functions:
- Local vs. Shared Resources
- CPU/IO memory devices (U14, U16, U20, and U22)
- GPIB interface (U26)
- Serial interface (U27)
- Cycle synchronization Local resources are those items which do not communicate by way of the Shared Bus Interface. This includes all resources located on the CPU assembly and any resource accessed by way of the Local Bus. Shared resources are items accessed by way of the Shared Bus Interface.

The GPIB Interface circuitry consists of controller U26 and octal GPIB transceiver/buffers U24/U25. U26 provides the CPU interface to the GPIB by way of functions such as GPIB data access, interrupt monitoring, serial and parallel poll operations, GPIB handshake control, and GPIB addressing. U24 provides the signal interface (TTL to GPIB) for GPIB data signals DI01 through DI08. U25 provides the signal interface (TTL to GPIB) for the data transfer byte control signals DAV, NRFD, NDAC, and the general interface management signals IFC, ATN, SRQ, REN, and EOI.

The Serial Interface circuitry consists of DUART U27, line receiver U28, line drivers U29 and U32, and 3.6864 MHz crystal Y2. U27 is a multi-function device supplying an interface to two asynchronous serial communication channels, while also providing a 16-bit counter/timer, and programmable bit I/O. U28 is a RS422/423 line receiver providing RS232C/RS423/RS422-to-TTL signal conversion. U29 and U32 are RS232C/423 line drivers providing channel A data and control signals and channel B data signal.

The Shared bus interface circuit provides two modes of external interfacing: Local or SAMBUS. In local operation, the bus is configured as an isolated extension of the Local bus. The address decode function is used to map an exclusive set of addresses to the Shared Bus so that access via the bus buffers is isolated from internal CPU/IO card activity.

Table 4 shows the 8088 CPU assembly I/O configuration switches and their proper operating positions.

TABLE 4

| SWITCH NO. | NAME | FUNCTION/POSITION |
|---|---|---|
| S1 | Master Clock Select | Equates the processor clock to the SAMBUS master clock. S1 jumpered; 5 MHz clock needed on SAMBUS. |
| S2 | Master CBRQST; BUSY | Provides the pull-up resistors for the open PULL-UP Select collector COMMON BUS REQUEST (CBRQST) signal and the BUSY signal. S2, no connection (single CPU system). |
| S3 | SAMBUS Request Select | Selects the SAMBUS request option for the bus arbitration circuitry. S3 jumpered P2-P3 (single CPU system). |
| S4-S7 | Memory Configuration | Configures the JEDEC memory sockets for devices U14, U16, U20 and U22 The devices appearing in the following list can be placed in any of the four sockets and will function correctly as long as the proper jumper configuration is followed. Consult the CPU diagrams in Chapter 7 for the selected devices used with your particular unit. Also observe the socket pinout diagram shown at the left. S4-S7: o 4K by 8 EPROM (2732a) jumper P5-P6 (lclall) jumper P13-P14 (vcc) o 8K by 8 EPROM (2764) jumper P1-P2 (pull-up) |

TABLE 4-continued

I/O Switch Configuration Positions

| SWITCH NO. | NAME | FUNCTION/POSITION |
|---|---|---|
| | | jumper P5–P6 (lclall) |
| | | jumper P10–P11 (pull-up) |
| | | o 16K by 8 EPROM (27128) |
| | | jumper P1–P2 (pull-up) |
| | | jumper P5–P6 (lclall) |
| | | jumper P12–P13 (lcla13) |
| | | jumper P10–P11 (pull-up) |
| | | o 32K by 8 EPROM (27256, S5, S6 S7) |
| | | jumper P1–P2 (pull-up) |
| | | jumper P5–P6 (lclall) |
| | | jumper P12–P13 (lcla13) |
| | | jumper P7–P8 (lcla14) |
| | | o 8K by 8 iRAM (2186) |
| | | jumper P2–P3 (lclrdy) |
| | | jumper P5–P6 (lclall) |
| | | jumper P8–P9 (write enable) |
| | | o 2K by 8 RAM (6116) |
| | | jumper P4–P5 (write enable) |
| | | jumper P13–P14 (vcc) |
| | | o 8K by 8 RAM (6264, S4) |
| | | jumper P1–P2 (pull-up) |
| | | jumper P5–P6 (lclall) |
| | | jumper P13–P14 (vcc) |
| | | jumper P8–P9 (write enable) |
| S8 | GPIB Interrupt Select | Connects the INTERRUPT from the TMS9914A to the GROUP INTERRUPT signal. S8 jumpered P1–P2 (interrupt enabled) |
| S9 | Serial Port Interrupt | Connects the INTERRUPT from the SC2681 to Select the GROUP INTERRUPT signal. S9 jumpered P1–P2 (interrupt enabled) |
| S10 | Serial Port | Configures the input of the two serial Configuration Select channels. S10 jumpered P1–P3 (channel A data/channel B data) |
| S11 | FIFO DMA Select | Allows generating a DMA request signal when the FIFO is ready to receive data on the SAMBUS side of the FIFO interface. S11, no connection (no DMA request). |
| S12 | FIFO Interrupt Select | Connects the INTERRUPT from the SAMBUS FIFO interface to the GROUP INTERRUPT SIGNAL. S12 no connection (software poll). |
| S13 | Single Processor Select | Configures the 8088 CPU I/O for either multiprocessor or single processor systems. S13 jumpered P2–P3 (single processor system) |
| S14 | Hold Acknowledge | Allows enabling data transfer onto the local Arbritration Selectbus from the SAMBUS when hlda is active S14, no connection (disable hlda SAMBUS-local bus transfer). |
| S15 | GPIB Controller Option | Defines the GPIB controller configuration Select for U26 to operate as a controller in a multiple-controller GPIB configuration. S15 jumpered P2–P3 (single controller) |
| S16 | Master/Slave Bus | Provides the proper signal source for the Grant Select Bus Grant SAMBUS signal. S16 no connection (single CPU system). |

3.3 Encoder/Timing Assembly (A3)

3.3.1 Overview

Figure 7:
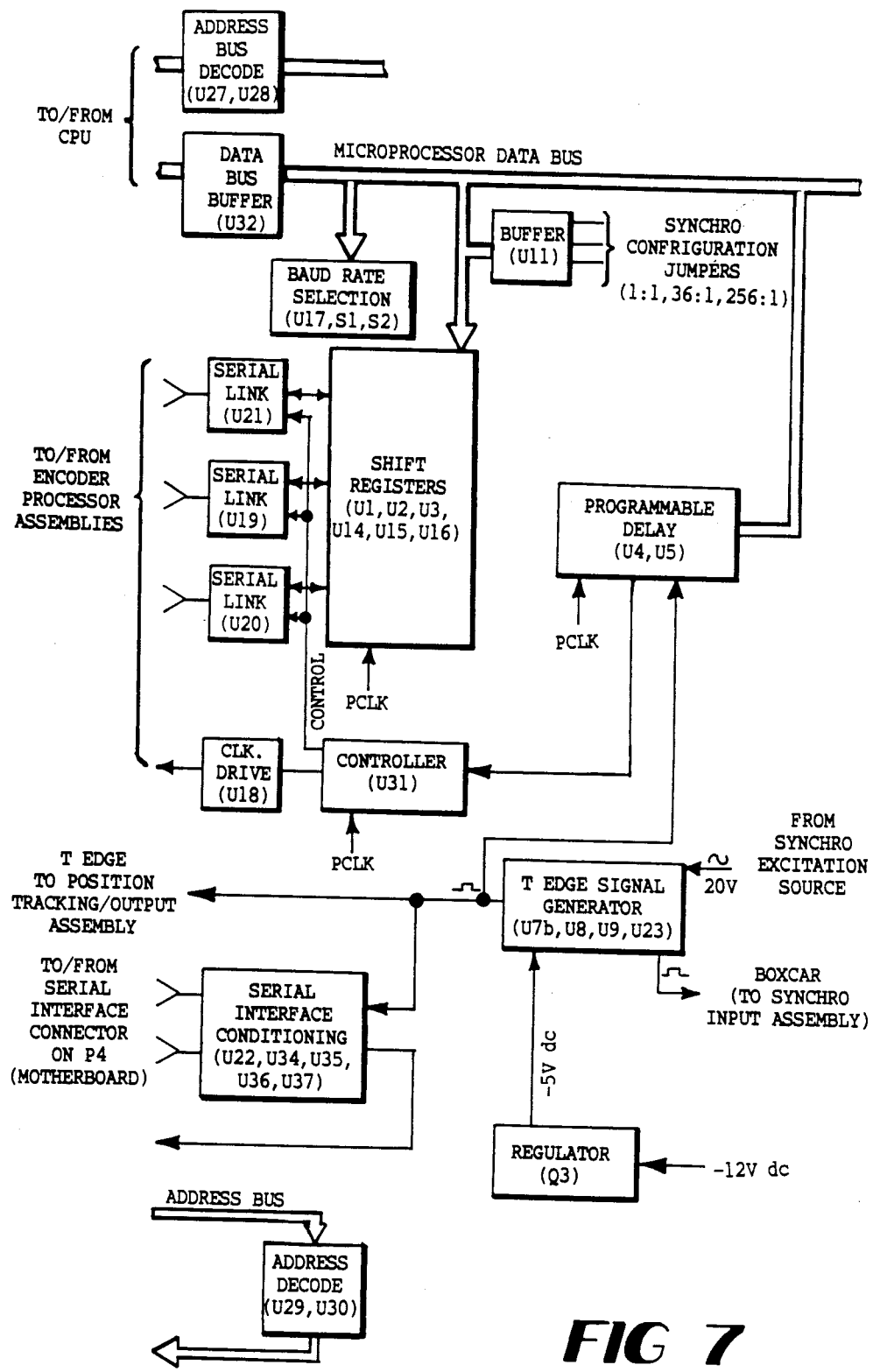
FIG. 7 is a block diagram of the encoder/timing assembly of the assembly of FIG. 1.

The main function of the Encoder/Timing assembly is interfacing the Encoder Processor assembly(ies) to the 1885 position indicator/1886 position data processor. However, this assembly also provides address decoding, signal conditioning for the serial interface, baud rate selection for the serial ports, and produces the BXCAR (or boxcar) and TEDGE (trigger edge) signals for the Synchro Input and Position Output/Tracking circuitry respectively. A block diagram of the Encoder/Timing assembly appears in FIG. 7.

3.3.2 Detailed Discussion

One of the major responsibilities of the Encoder/Timing assembly is interfacing the Encoder Processor Unit (see Section 47 to the 1885 position indicator/1886 position data processor. U19, U20, and U21 are bi-directional buffers, each corresponding to one of the three possible Encoder Processor Units. U18 provides clock drive signals ECK+ and ECK— for the Encoder Processor Units. The bi-directional operating characteristics of U19, U20, and U21 are controlled by PAL U31. When U31 places these buffers in the transmit mode to trigger data sampling, a trigger pulse sequence goes to the Encoder Processors. Immediately following, U31 reverses the buffers to receive incoming 16-bit data from the Encoder Processors, and enables the shift registers to store the data.

U1, U2, U3, U14, U15, and U16 form three 16-bit shift registers. These registers accept 16-bit data from the Encoder Processors over the serial links. In this manner, the CPU may read the data over the microprocessor data bus. PAL U31 also requests a "calibration conversion" from the Encoder Processor at the proper time periods determined by the CPU. Output lines C0 and C1 of latch U4 transfer these commands from the microprocessor data bus to U31.

Another important function of the Encoder/Timing assembly is generating an integration boxcar (BXCAR) control signal for the Synchro/Input assembly, and a related timing edge (TEDGE). TEDGE corresponds to the center of the boxcar interval. Since the synchro signal integration must be in phase with the synchro excitation, BXCAR and TEDGE are generated by a phased-locked loop (U7, U8, and U9) which locks onto the line frequency.

The 1885 position indicator/1886 position data processor is designed to minimize group delay error (the difference between the time a certain position is indicated and when it actually occurs). Such errors can be significant and troublesome since they vary directly with axis velocity. TEDGE provides the sample timing information required to synchronize the indicated position data to the actual position. A more detailed description of TEDGE is provided in Section 3.6.2.

When an 1886 position data processor is used in the system, TEDGE must be made available to the 1885 position indicator by way of the serial link. The circuitry for injecting a special synchronization byte consists of U24, U25, and associated components. This circuit is disabled under CPU control in the 1885 position indicator.

Another source of group delay is the inherent processing delay of the Encoder Processor assemblies. Programmable delay, U5, looks at a signal derived from TEDGE through flipflop U10. This signal forces U5 to create a delay which compensates for the roughly 250 microsecond group delay inherent in each Encoder Processor.

J1, J2, and J3 are synchro configuration jumpers providing selection of 1:1/256:1, 1:1/36:1, or 1:1 only synchro speeds for each of the three rear panel inputs. Buffer U11 allows the CPU to read the six synchro speed bits from these jumpers.

Flipflops U13a and U13b act as interrupt devices. Control lines C6 and C7 from U4 are inputs to these flipflops, serving to enable and disable specific interrupt functions. U13a provides the interrupt function EDR (Encoder Data Ready), deriving its input signal from RCLK (register clock) of the shift registers. U13b provides the interrupt function ESB (End of Synchronization Byte), which indicates the availability of Serial Channel A subsequent to transmission of a synchronizing byte (1186 position data processor only).

Both onboard and offboard address decoding are performed on the Encoder/Timing assembly by decoders U27, U28, U29, and U30. U27 and U28 decode the address bus for the Encoder/Timing assembly itself, while U29 and U30 provide additional address decoding for various circuitry throughout the unit. Data bus buffering is accomplished through U32.

U17, S1, and S2 from the baud rate configuration selection circuitry. S1 and S2 are rotary DIP switches for selecting 8bits of data for baud rate configuration of the serial ports to be read by the CPU.

U22, U34, U35, U36, U37 and associated components make up the serial interface conditioning circuitry. Here, signal conditioning on two channels of serial I/O data are performed.

U38 regulates —5 vdc from —12 vdc for use in the line frequency signal conditioning circuitry (U9).

3.4 Synchro Input Assembly (A4)

3.4.1 Overview

Figure 8A:
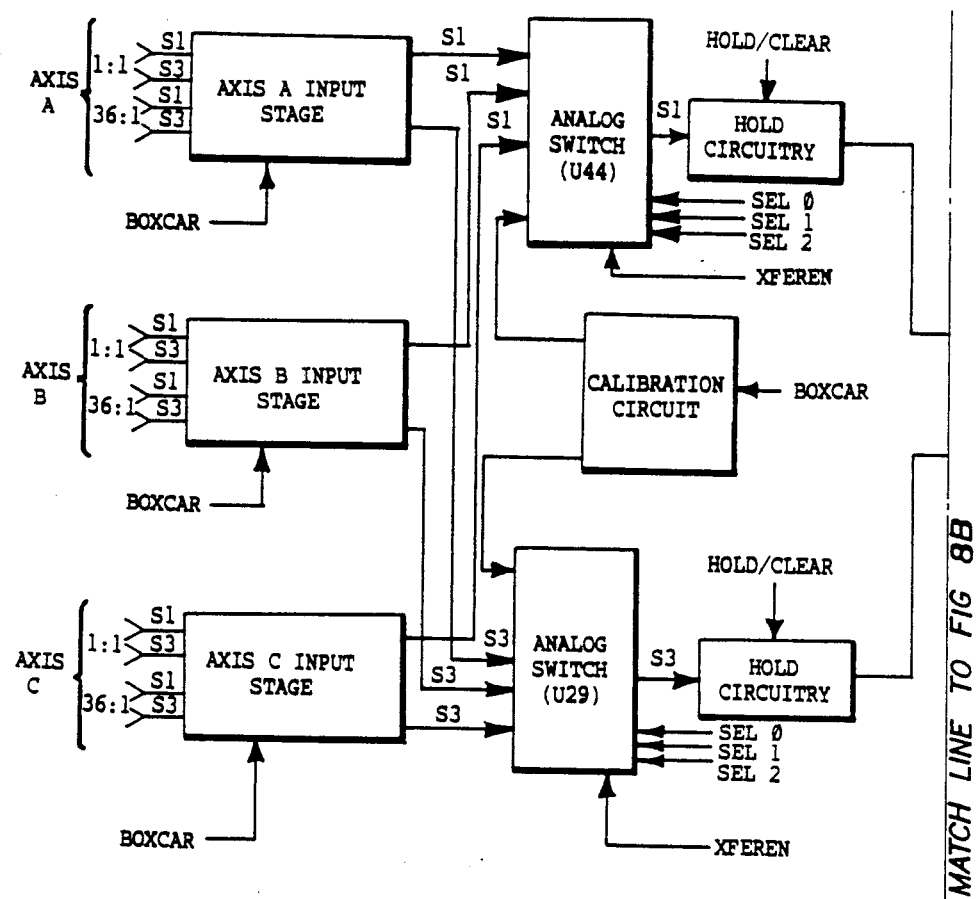
FIG. 8A and 8B are a block diagram of the synchro input assembly of the assembly of FIG. 1.
Figure 8B:
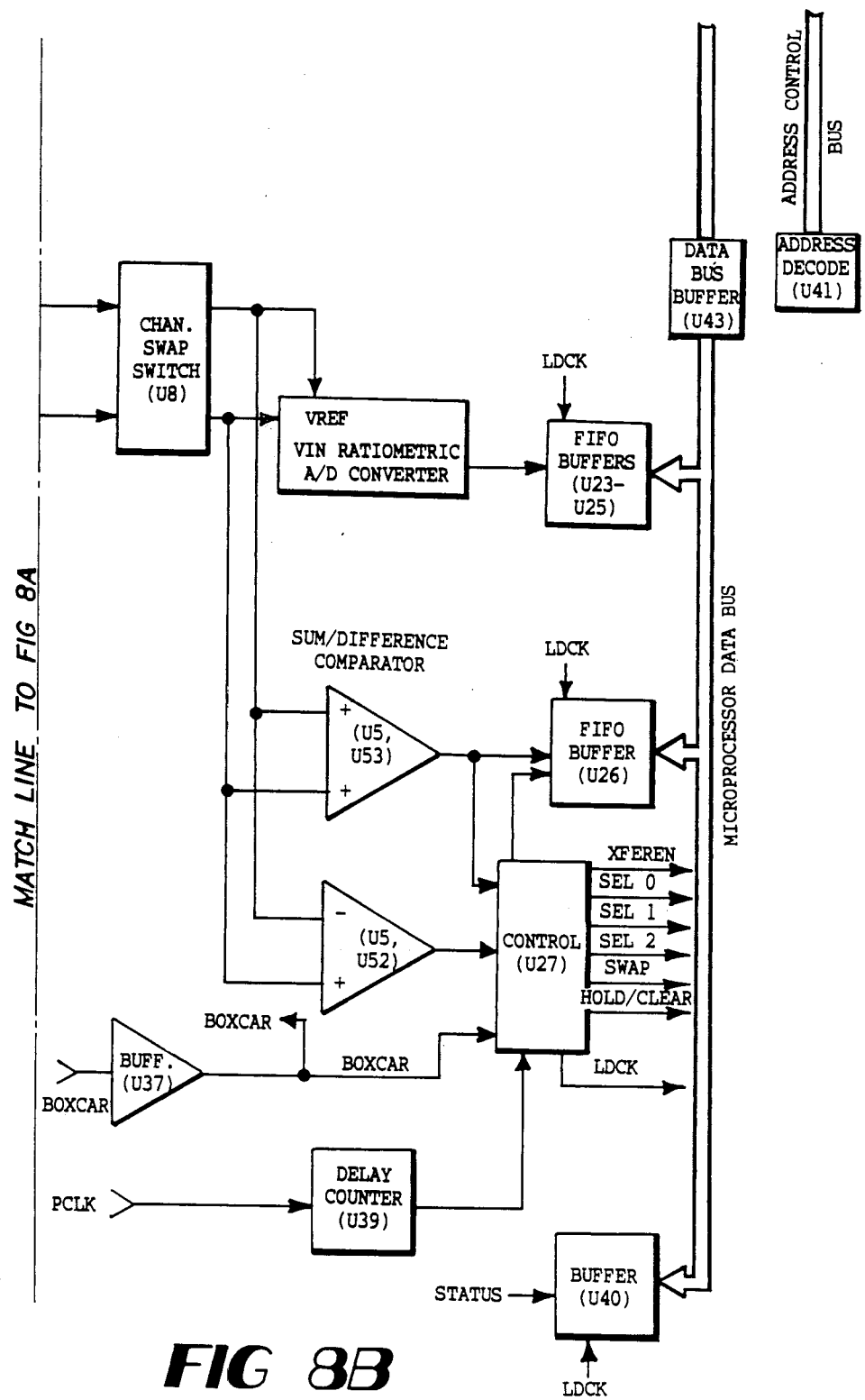

The Synchro Input assembly accepts and conditions single or dual speed synchro analog position data received through the rear panel Position Input connectors. A block diagram of Synchro Input assembly appears in FIG. 8.

b. 3.4.2 Detailed Discussion

Three identical stages comprise the input channel circuitry of the Synchro Input assembly. Therefore, to simplify the discussion of the input stages, only circuit components in Axis A input stage are discussed.

Up to three separate axes of analog position data enter the Synchro Input assembly by way of precision-matched resistors. Each Position Input accepts S1 nd S3 analog signals from both 1:1 and 36:1 synchro transmitters.

The 1:1 Axis A, S1 input signal enters through resistors which match 1:1 Axis A, S3 input resistors. This matching insures identical processing to both signals applied to the Position Inputs. The axis input stage includes four integrators for the Axis A input signals. BOXCAR, a signal originating at the Encoder/Timing assembly (see Section 4.3.3) and buffered through U37, controls switches in the axis input stage causing signal integration or hold to take place.

During the first half-cycle of BOXCAR, a logic "high" puts the axis input stage in the integrate mode. This causes the stage to integrate analog signals S1 and S3 for both the 36:1 and the 1:1 inputs. During the second half-cycle of BOXCAR signal, the circuits are in the hold mode, allowing a charge transfer to capacitors in the stage.

Integration is performed simultaneously on all S1 and S3 input signals. When integration is complete, the signals are multiplexed sequentially through analog switches U29 and U44. These switches select one of the six S1 input signals and the corresponding S3 input signal as output signals into hold circuitry. Address lines A0, A1, and A2 from PAL U27 control the selection process for these analog switches. XFEREN (transfer enable) signal, also from U27, informs U29 and U44 as to the proper time to enable the selected output signal. After the measurement is complete, the HOLD/CLEAR signal dumps the previously transferred charge from the hold circuitry.

The signal from each axis goes through a 4-step process after BOXCAR is complete:

1. Charge transfers to holding capacitors in the hold circuitry from respective integration capacitors.

2. Control logic (U27) decides if channel swapping is necessary, then initiates the A/D process.

3. The voltage on capacitors in the hold circuitry is ratiometrically converted to digital form.

4. Charge is cleared from the hold circuitry.

Consider, for example, the 1:1 Axis A, S1 analog signal path. A capacitor in the axis input stage for the S1 signal transfers its contents to a capacitor in the S1 hold circuitry through U44 during a period of about 820 microseconds. This process results in an output voltage representative of S1. During the same time period, the charge present at a capacitor in the axis input stage for the S3 signal transfers to a capacitor in the S3 hold circuitry, resulting in a voltage representative of S3.

Channel swapping switches, U8a and U8b, couple the output signals from the hold circuitry to the ratiometric conversion A/D circuitry. Sum-and-difference comparators in the ratiometric conversion A/D circuitry and logic control circuitry (U27) determine which of the two output signals from the hold circuitry is larger and apply it to a buffer. This larger signal acts as the reference signal for the ratiometric conversion A/D circuitry.

The ratiometric A/D conversion is performed by successive approximation. The ratiometric converter IC (a 7541 A IC) generates a series of "guesses" as to the valid result which are compared with the actual signals by way of the D/A conversion circuitry. These guesses rapidly converge to an accurate 12-bit result.

When FIFO (First-In-First-Out) buffers U23, U24, U25, and U26 receive the LDCK (load clock) command from U27, resultant 12-bit parallel data from the ratiometric converter IC is strobed into the FIFOs. In addition, U26 accepts the resultant data of associated status lines (SWAP, AGTB) and select lines SEL 0 and SEL 1. Additional status information is available to the CPU through buffer U40.

A calibration circuit provides a calibration signal to the analog switch and hold circuitry. This calibration signal provides the correction factor necessary to compensate for the difference in value between the capacitors in the S1 and S3 hold circuitry. The calibration cycle is the seventh conversion, performed after the six input channels conversions have been done.

As mentioned previously, U27 provides the control for the Synchro Input assembly. Control functions provided include:

o control signals XFEREN, SEL 0, SEL 1, and SEL 2 for U44 and U29 o control signal SWAP for U8a and U8b o control signal START/ for the ratiometric converter IC o control signal HOLD/CLEAR (LDCK) for the hold circuitry.

o control signal to clear delay counter U39

Delay counter U39 assists U27 in determining adequate charge and discharge intervals for the capacitors in the hold circuitry. U27 "clears" delay counter U39 at the beginning of each transfer operation to provide a delay reference point.

U38a provides an interrupt signal (GINT). GINT informs the CPU that all seven conversions are complete and the results are available in the FIFO's.

U43 is a read-only data bus buffer, isolating the on-board bus from other circuitry. U41 provides address decoding and other functions.

3.5 Memory/Interface Assembly (A5)

3.5.1 Overview

Figure 9:
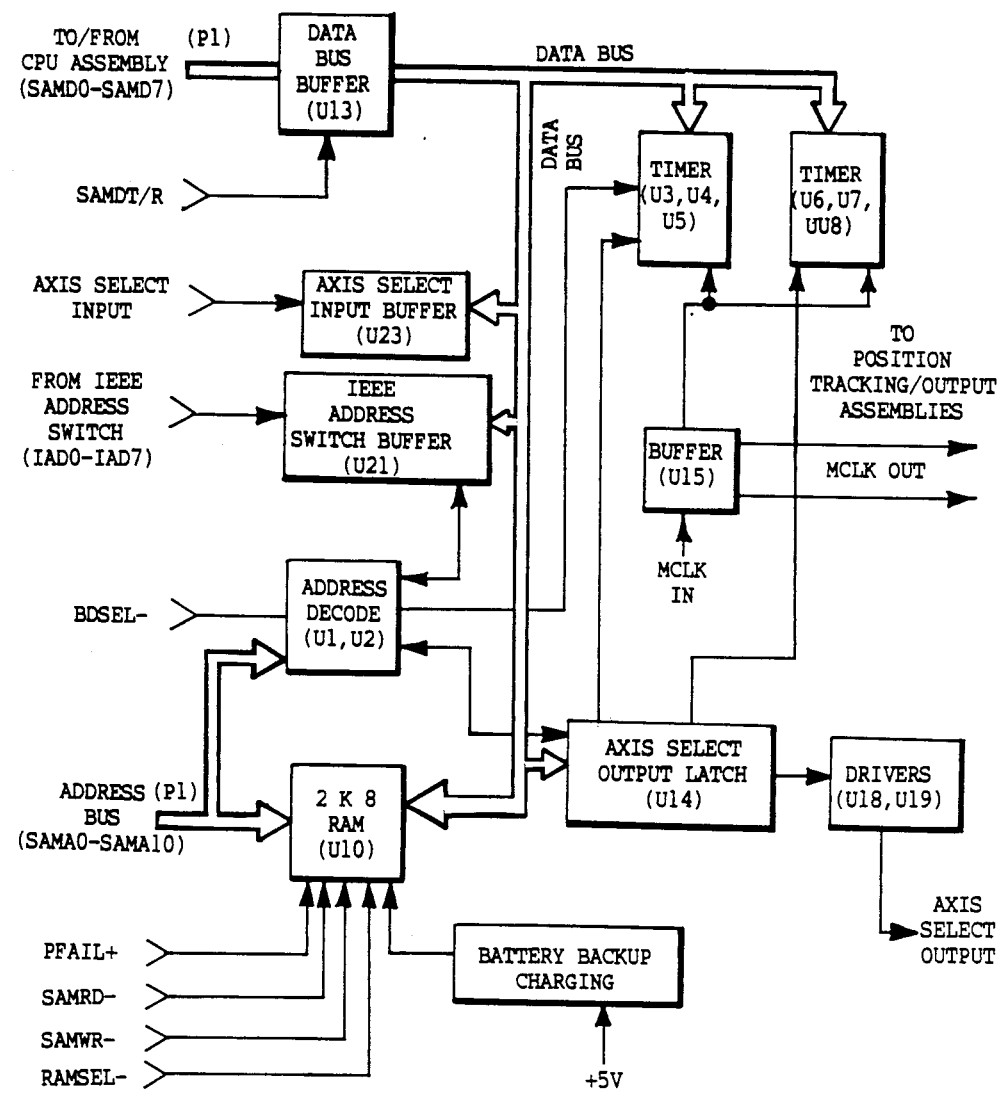
FIG. 9 is a block diagram of the memory/interface assembly of the assembly of FIG. 1.

The Memory/Interface assembly performs multiple function including:

o provides non-volatile memory
o provides interface circuitry
o provides sample interval timers
o provides buffers for MCLK signal
o provides address decoding and data bus buffering FIG. 9 is a detailed block diagram of the Memory/Interface Assembly.

The non-volatile memory circuitry consists of 2K by 8 Random Access Memory (RAM) with battery back-up. Interfacing circuitry allows appropriate circuit assemblies of the 1885 position indicator to read data from the rear panel IEEE-488 address switch, Axis Select Input, control lines of the Position Output, and output lines of the Axis Select Output.

Also on this assembly, two timers measure the interval between position samples for each Position/Tracking Output assembly. A buffering stage for MCLK+ provides buffering before MCLK+ goes to the Position Tracking/Output assemblies. Address decoding and buffering for the data bus completes the list of duties for the Memory/Interface assembly.

3.5.2 Detailed Discussion

The Memory/Interface assembly connects to other 1885 position indicator assemblies through connector P1. Data between the microprocessor data bus and the Memory/Interface assembly are buffered through U13, a bi-directional buffer. The data flow direction for U13 is determined by the SAMDT/R signal at the DIR input (pin 1) of U13. Data bits are labeled SAMD0 through SAMD7.

U1 and U2 perform address decoding for data operations. U1 handles the writing function while U2 handles the reading. The Encoder/Timing assembly (A3) generates the BDSEL (board select) signal by decoding upper address lines SAMA4 through SAMA19. The lower four address lines (SAMA0 through SAMA3) feed directly into U1 and U2.

The primary component making up the memory circuitry is a low-power, CMOS RAM integrated circuit (U10). U10 obtains power from battery BT1 when a power is removed. The RAM chip select line (CS) function at pin 18 of U10, is controlled by the PFAIL+ (power fail) signal through transistor Q3. The PFAIL+ signal originates from the Power Supply assembly (A13). Under normal operating conditions, the PFAIL+ signal to Q3 is logic "high". This action turns Q3 ON and shorts pin 18 to ground, enabling U10. However, if ac power to the unit is removed (either intentionally or non-intentionally), the PFAIL+ line becomes logic "low" placing Q3 in an OFF mode. In this case, the chip select line disables U10 forbidding any read or write transactions to take place. Power from the battery back-up and charging circuit takes over to retain the memory contents. Because this circuit operates without a dependency on the CPU assembly, memory contents are retained whether the unit is in the process of powering up, powering down, or powered completely down.

OR-GATEs U12A and U12D select either read (SAMRD−) or write (SAMWR−) functions for the RAM from the data bus. Pins 20 and 21 of U10 are the OE (output enable) and WE (write enable) lines. When OE is active, U10 places data onto the data bus for reading by the CPU assembly, while when WE is active, U10 accepts data from the bus for storage in the RAM location specified by the address lines. The Encoder/Timing assembly generates the RAMSEL− (RAM select) input signal. RAMSEL− determines which address blocks will specify RAM U10 by decoding the upper order address lines (SAMA11-SAMA19).

A 3.6 v nickel-cadmium (NiCad) battery maintains power on the memory circuit when power is removed. Typically, memory contents are maintained for 4 to 6 months without powering-up the unit. Since the timer counters clock at a 5 MHz rate, each "count" corresponds to a 200 nanosecond time period. When a FBLTRIG (feedback latch trigger) signal from the Position Tracking/Output assemblies trigger RCK input (pins 13), the timer data is latched and is held to be read by the CPU. (Remember from earlier discussions that FBLTRIG signal synchronizes with the falling edge of MCLK+, and that the timer updates on the positive edge of MCLK+ to provide valid timer data when the triggers occurs.) After the CPU reads the timer, it subtracts the previously-read value and multiplies the difference by 200 nanoseconds to determine the elapsed time. This time is used in calculating the tracking velocity value sent to the Position Tracking/Output assembly (see Section 4.2.4).

OR-GATE U12B accepts a record increment interrupt input from each Position Tracking/Output assembly and sends this interrupt to the CPU (through PP12). The output of U12B also drives the record increment trigger signal (RINCTR+) for future use.

3.6 Position Tracking/Output Assemblies (A6 and A7)

3.6.1 Overview

Figure 10:
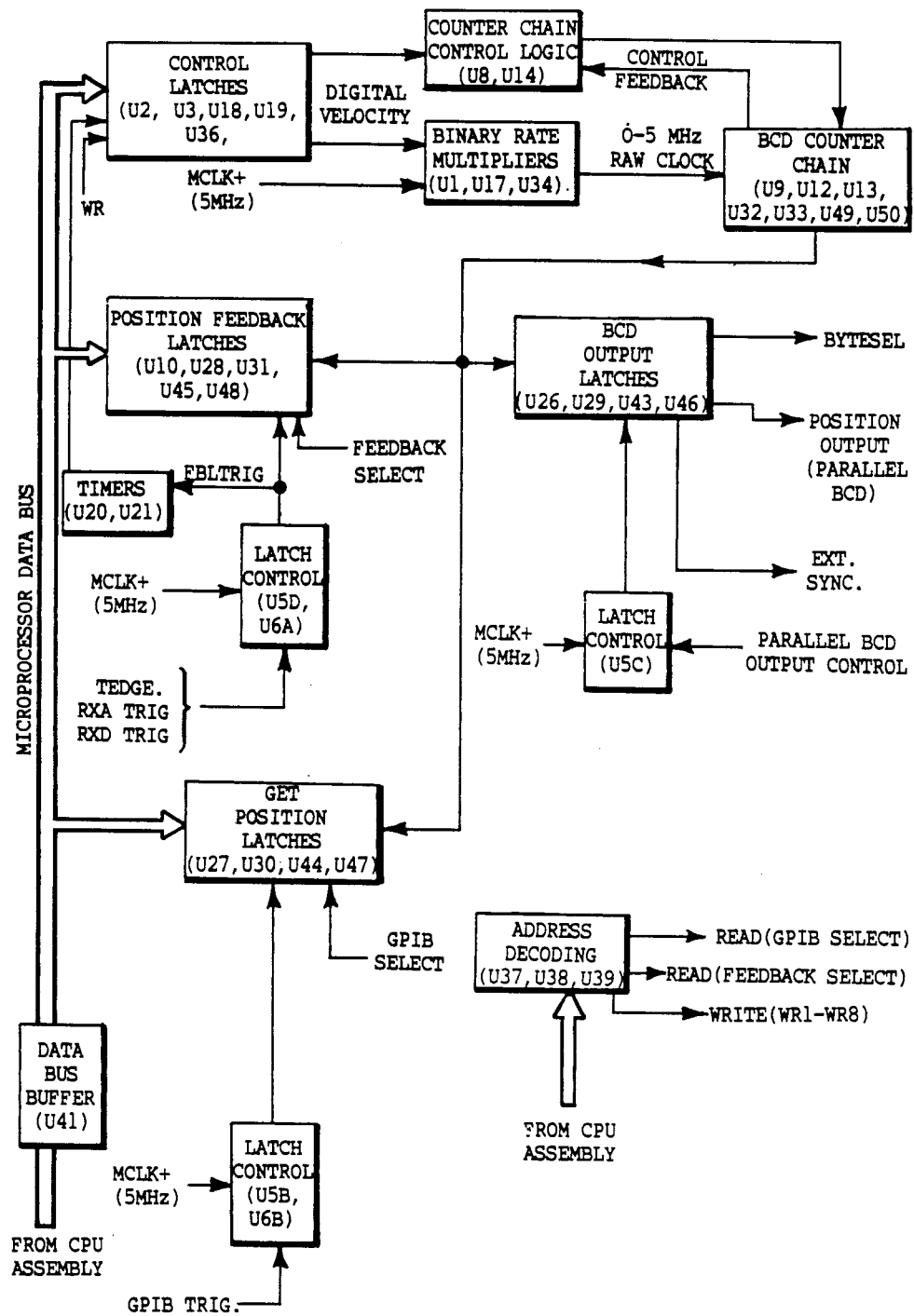
FIG. 10 is a block diagram of the position output tracking assembly of the assembly of FIG. 1.

The Position/Tracking Output assembly (FIG. 1) provides high speed position output data for the 1885 position indicator. This assembly operates by simulating actual positioner movement for a position display/output that is always up-to-date and simultaneous with actual positioner movement. FIG. 10 provides a detailed block diagram of the Position Output/Tracking assembly.

The Position Tracking/Output assembly interfaces to the CPU assembly at various locations. Control latches accept data from the microprocessor data bus to provide the binary rate multipliers with digital velocity data. The binary rate multipliers produce a corresponding output signal of 0 to 5 MHz, depending on the value of the input data. The output from the binary rate multipliers act as a clock input for the 8-decade BCD counter chain. Therefore, the rate of the BCD counter chain is proportional to the velocity and direction of a positioner's actual movement. For example, a higher frequency rate (f) indicates rapidly-changing position while a lower frequency indicates slower movement. The frequency is determined by the following equation:

$$f = (\text{input}/^{18}) \times 5 \text{ MHz}$$

The main device of the counter chain control logic is a PAL (programmable array logic). The PAL determines the direction of positioner movement for the counter chain and also senses critical position data roll-over points (for example, when the position data must go from 359.9999 to 000.0000).

The output of the BCD counter chain drives three sets of latches: the BCD output latches, the position feedback latches, and the GET position latches. The BCD output latches provide the signal for the Position Output connectors on the rear panel by sampling the BCD counter chain output any time a "take-sample" trigger command is received through the EXT TRIG input (assuming an INHIBIT signal is not applied). The BCD output latch control circuitry synchronizes the EXT TRIG signal with a 5 MHz clock signal to assure data at the output of the counter chain are valid. Because of this synchronization, the output latch update pulse may occur up to 200 nanoseconds after the EXT TRIG is applied.

The position feedback latches provide the CPU with the value of the position data at the output of the counter chain. The Encoder/Timing circuit strobes these latches simultaneously with the input sample. The CPU compares the BCD counter chain output with the absolute position data from the Position Inputs, calculates the velocity value, and sends this value back to the control latches. When the positioner is moving at a constant velocity, as it should be during data collection, these two values are the same. If these values are not the same, the CPU corrects for the error by adding or subtracting from the calculated velocity.

To guarantee accurate data results, the position feedback latches must sample simultaneously with the input sample. To insure this synchronization when data enters through Position Inputs, the latch control circuit "enables" the position feedback latches on a trigger edge (TEDGE) command provided by the Encoder/Timing assembly (A3). When TEDGE occurs, the position feedback latches sample the BCD counter chain within 200 nanoseconds. At the same time, the samples from the Position Inputs take place. The CPU "reads" data from both the Position Inputs and from the position feedback latches, comparing the data for velocity calculations. During velocity calculations, the CPU also reads a timer on the Memory/Interface assembly. This timer, activated by a feedback latch trigger (FBLTRIG), measures the length of each sample period. FBLTRIG is synchronized with TEDGE and to the 5 MHz clock as are the output latches.

When input data enters through the Serial Interface inputs from an 1886 position data processor, the sampling process becomes more complex. A serial I/O trigger signal (RX TRIG) sent to the position feedback latch control circuitry from the 1886 position data processor Encoder/Timing assembly triggers the position feedback latches. Timing for this triggering signal is accomplished in the following manner.

Assume the 1886 position data processor has sent data from the previous sample point to the 1885 position indicator over the serial interface and is now idle. The 1885 position indicator recognizes this condition and waits to receive a trigger for the next sample point. On receiving a sample trigger pulse, the position feedback latch control circuitry "enables" and examines the incoming latch control serial data. If no data are being sent, the serial line is logic "high". Each time the 1886 position data processor timing circuitry produces a RX triggering pulse, the serial interface line goes logic "low" and remains low for several bit-times. This process triggers the position feedback latch control circuitry. After synchronizing with the 5 MHz clock, the latch control circuitry triggers the feedback latches sampling the position data. After time has expired, the serial interface line goes logic "high" again, and remains high until after the stop bit. (Remember: serial data consists of 8-bit data groups, with an additional START bit which is always low and a STOP bit which is always high). In other words, position data samples are taken by the 1886 position data processor, while simultaneously, the 1885 position indicator samples the position feedback latches. The 1885 position indicator CPU reads these latches. After the short period of processing and receiving data from the 1886 position data processor expires, the CPU performs velocity calculations, and determines the necessary error compensation corrections. The corrected data are then sent to the control latches as described previously.

The GET (Group Execute Trigger) position latches respond to an IEEE bus command appropriately named "GET" Whenever a GET signal appears on the microprocessor bus, the CPU assembly sends a logic "high" GPIB trigger signal to the GET position latch control circuitry. The latch control circuit synchronizes this signal to the 5 MHz clock. Within 200 nanoseconds, the GET latches sample the output of the counter chain. Therefore, by carefully controlling the implementation of the GET signal, precision data is obtained over the bus.

3.6.2 Detailed Discussion

Data between the microprocessor data bus and the Position Tracking/Output assemblies are buffered through U41, a bi-directional buffer. Data bits are labeled SAMD0 through SAMD7.

Control latches U36, U35, U19, U18, U3, and U2 are configured in a double-buffered stage. The first stage, consisting of write latches U36, U19, and U3, accepts and stores updated velocity data from the microprocessor data bus. On a later command, the write latches transfer the complete 3-byte data set simultaneously to the second control latch stage consisting of the U35, U18, and U2. When binary rate multipliers U34, U17, and U1 detect the rising edge of the 5 MHz MCLK+ timing signal at pin 9, they begin counting at the new velocity rate. The "Z" output at pin 5 of U34, U17 and U1, combine at NAND-gate U7C to produce another output timing signal called RAWCLOCK. RAWCLOCK, through flipflop U16B, provides the count clock and load signals for the BCD counter chain (U9, U13, U12, U49, U50, U32, U33 and U11).

Latch U2 has several control bits that also change during the process of transferring data to the control latches. The NEGVEL (negative velocity) line at pin 9 determines the direction (up/down) and sign (+,−) for the BCD counter chain while RNGE (range) line selects the 360 or 180 range. SPCTRL-A, B and C are speed control bits responsible for selecting the counting speed for the BCD counter chain. Position changes in 0.0001° or 0.00001° increments, depending on tracking velocity.

Figure 11:
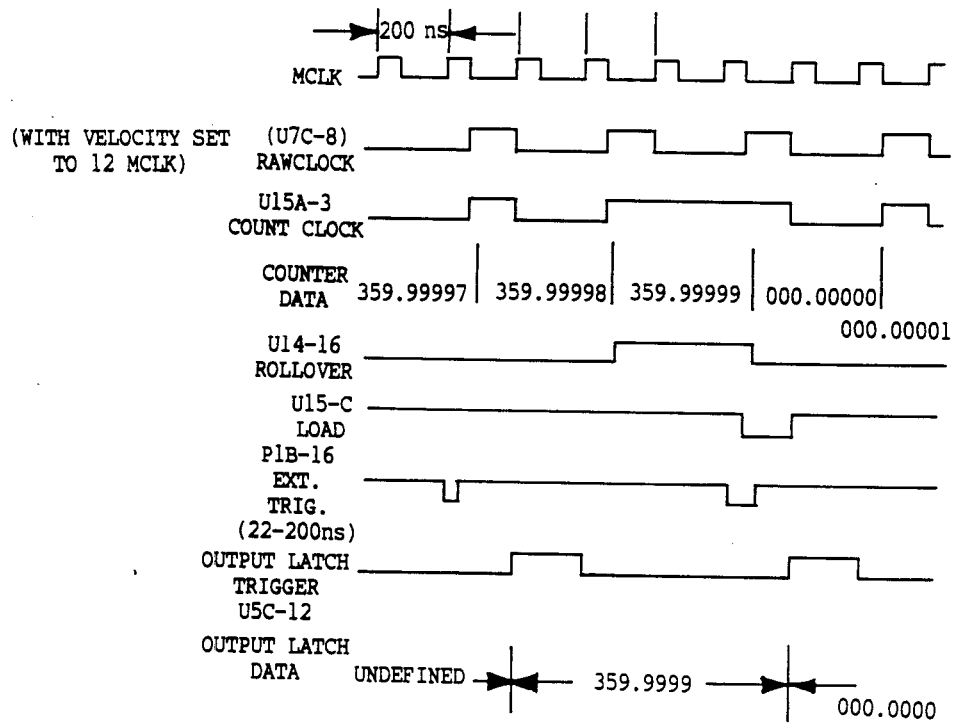
FIG. 11 is a diagram illustrating timing signals of the position tracking output assembly of FIG. 1.

FIG. 11 shows the relationship of the various timing signals used on this assembly. MCLK+ is a 5 MHz, ⅓-⅔ duty cycle signal generated by the CPU assembly. MCLK+ is used primarily by the binary rate generators to produce the positive count clock signal (RAWCLOCK) for the BCD counter chain. RAWCLOCK is inverted with respect to MCLK+ to provide proper timing control of the counters and various latches.

The rising edge of RAWCLOCK occurs when counter chain data require changing by one least significant count. Two signals, COUNT CLOCK (U15A-3) and LOAD (U15C-8), accomplish this task. The COUNT CLOCK signal feeds the clock input of the counters, acting as the usual mechanism for changing the data in them. However, when a ROLLOVER condition occurs, the data are changed by the LOAD signal. (A ROLLOVER condition occurs when counter data is one count below "zero" and the counter chain is counting up, or when data are "zero" and the counter chain is counting down). Note that LOAD and COUNT CLOCK signals are the only signals responsible for changing counter data. These signals change data only on the rising edge of RAWCLOCK (or in effect, the falling edge of MCLK+.

Each individual counter of the BCD counter chain is a synchronous-type (or having a common clock) counter, responsible for one of the eight decades of position data. The following example shows the role of each counter in the case of BCD output data:

| COUNTER | Position Data: 359.99999 | |
|---------|-------|------------|
|         | DIGIT | RESOLUTION |
| U29     | 3     | 100°       |
| U32     | 5     | 10°        |
| U34     | 9     | 1.0°       |
| U36     | 9     | 0.1°       |
| U40     | 9     | 0.01°      |
| U41     | 9     | 0.001°     |
| U45     | 9     | 0.0001°    |
| *U46    | 9     | 0.00001°   |

*for internal use only

The counter chain is controlled through U14 and U8, two programmable array logic (PAL) integrated circuits. U14 controls the sign, direction, count clock, and load signals, and U8 controls the speed range. A brief description of each signal follows.

CHANGE DIR (U14, pin 19) provides proper counting for the BCD Counter Chain during counting sequences where, for example in the 180 mode, counting is in an upward direction from +170 to +179.99999. Immediately after 180, the counters must count downward beginning with −179.99999. CHANGE DIR clocks a flipflop forcing the output at pin 5 to toggle. This is the RAWSIGN input to U14, pin 9 which is used to determine the SIGN of the data.

DN/UP (down/up, U14, pin 12) determines the count direction for the counter chain by evaluating input signals RAWSIGN (pin 9) and NEGVEL (pin 11). If the absolute position value is becoming larger, the counter chain receives a count "up" command from U14. If the absolute value is decreasing, the counter chain receives a count "down" command.

SIGN (U14, pin 18) is determined by RAWSIGN and RANGE. For example, SIGN is always "+" for data in the 0–360 and 0 to +180 range, and "−" for data in the −179.99999 to 0.0000 range.

Figure 12:
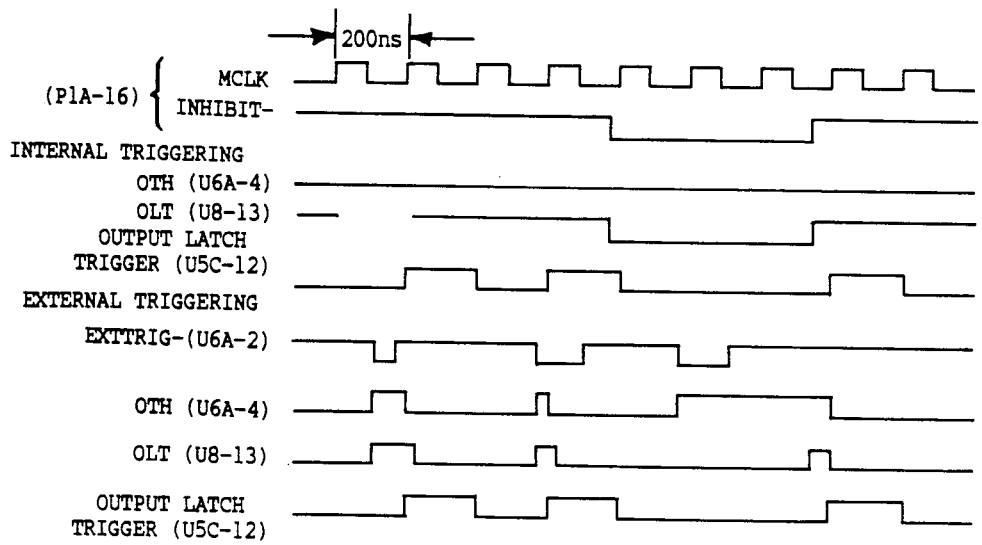
FIG. 12 is a diagram showing output latch internal and external triggering in the assembly of FIG. 1.

ROLLOVER and ROLLOVER (U14, pins 15 and 66 respectively) respond to the input signals to determine when a rollover point is necessary (for instance when going from 359.99999 to 000.00000). The output at pin 16 is shown in the timing diagram of FIG. 12. Two conditions cause these signals to become active:

○ when RANGE is 0-360 and the counters are counting up and the position is 359.99999

○ or when RANGE is 0–360 and the counters are counting down and the position is 0.00000.

PRST (preset) signal at pin 17 of U14, controls some of the input bits A, B, C and D (pins 15, 1, 10 and 9 respectively) of the individual counter chain counters. Two preset conditions require loading the data into these counters, both occurring in the 0–360. range. One condition is when the next number counting downward from "0" is a 359.99999. The PRST line goes logic "high" and the data load. In this case, U9 is digit "3" of 359.99999, U13 digit "5", U12 a "9" and all remaining counters at "9". The other preset condition requiring data loading is when counting upward to zero from 359.99999 on the next clock edge. In this case, PRST line is "low" and all of the counters load "0".

MAX/MIN (maximum/minimum) is the counter output signal used to indicate when the counters have reached either their maximum or minimum counting capacity (at nine and counting up, or zero and counting down for example). When this happens, a carry or borrow to the next stage is necessary. PAL U8 accepts four Max/Min input signals: M/M1, M/M2, M/M3 and M/MA. Each come from their respective counters—M/M1 (pin 8) from U11, M/M2 (pin 2) from U33, and M/M3 (pin 3) from U32. M/MA, however, is a signal from U7A which is the combination of Max/Min outputs of U12, U49 and U50. U8 accepts all four of the Max/Min signals and sends one COMB M/M output signal (at pin 12) to PAL U14 (pin 1). U14 combines the signal at pin I with M/M7 (pin 2) from U13. Observe the only Max/Min signal not used——pin 12 of U9, the most significant digit counter. Data for A1 and A2 (one-hundreds and two hundreds bits at pins 4 and 5 of U14) enter PAL U14 to generate an equivalent Max/Min for U9.

REC INC CLK EN (Record Increment Clock Enable) output signal at U (pin 15) enables the record increment counter (U23 and U24) through input commands from SP CTRL (speed control) inputs and the Max/Min inputs.

The enable outputs, EN2, EN3, and EN4 of U8 (pins 19, 18, and 17 respectively), activate specific counters to allow them to count at the appropriate time. At low speeds (less than 8.33 RPM), the enable outputs are equal to the corresponding ripple carry output from the previous counter stage. For example, EN2 is equivalent to the ripple output from U11, pin 13. Under these conditions, U11, the least significant counter, provides an overall resolution of 0.00001. So each positive edge of COUN CLOCK (U15A-3) causes the counter chain to change by 0.00001°. Therefore, at a rate of 5 MHz, only speeds with velocities of up to 8.33 rpm are possible (5 MHz×0.00001=50° /sec or 8.33 rpm). Therefore, to enable operation at speeds greater than 8.33 rpm, U33 is always enabled by EN2 and becomes the least significant digit rather than U11. This process slightly lowers the accuracy of the data but allows input velocities of up to 83.3 rpm. Faster speeds are possible using EN3 and EN4 outputs of U8 in a similar fashion. Binary operation is similar but the counters have a different weight. Enable signals are produced by combining SP CTRL (speed control) inputs and CARRY inputs. Table 5 shows how the speed control bits affect position counter resolution and speed as well as the record increment counter resolution.

TABLE 5

Speed Control Bits

| C | B | A | POSITION CNTR. RESOLUTN. BCD | BINARY | RECORD INCREMENT CNTR. RESOLUTN. BCD | BINARY |
|---|---|---|---|---|---|---|
| 0 | 0 | 0 | 0.00001 | 30 bits | 0.0001 | 26 bits |
| 0 | 0 | 1 | 0.0001 | 26 bits | 0.0001 | 26 bits |
| 0 | 1 | 0 | 0.001 | 22 bits | 0.001 | 22 bits |
| 0 | 1 | 1 | 0.01 | 18 bits | 0.01 | 18 bits |
| 1 | 0 | 0 | 0.00001 | 30 bits | 0.001 | 22 bits |
| 1 | 0 | 1 | 0.0001 | 26 bits | 0.001 | 22 bits |
| 1 | 1 | 0 | 0.001 | 22 bits | 0.001 | 22 bits |
| 1 | 1 | 1 | 0.01 | 18 bits | 0.01 | 18 bits |

Expected normal usage is for C, B, A to be 0,0,0 or 0,0,1 for BCD (depending on the speed) and 1,0,1 or 1,1,0 for binary. This gives 0.0001 or 22 bits resolution for record increments up to 70 RPM.

| B | A | MAXIMUM SPEED (RPM) BCD | BINARY |
|---|---|---|---|
| 0 | 0 | 8.333 | 0.27 |
| 0 | 1 | 83.33 | 4.47 |
| 1 | 0 | 833.3 | 71.5 |
| 1 | 1 | 8333 | 1114 |

Even though maximum speed is 70 RPM for the counter chain, the positioner must not move faster than the specified maximum speed.

For the remaining counter stages, the RIP CLK (ripple clock) output at pin 13 (U50, U49, U12 and U13) connect to the enable input (EN G, pin 4) of the succeeding counter stages (U49, U12, U13, U9). RIP CLK output designates whether the counter is at nine and counting up, or zero and counting down. As mentioned previously, DN/UP (down/up) signal at pin 5, tells whether the counter is going up or down. For example, if the counter is at nine and counting upward, the enable pin of the next counter stage is activated. On the edge of the following clock pulse, it counts up while the initial counter moves to zero.

The output of the BCD Counter Chain connects in parallel to three different sets of latches:
○ BCD Output Latches
○ Position Feedback Latches
○ GET Latches The BCD output latches, U43, U26, U46 and U29, provide counter data for the 37-pin rear panel Position Output connectors. The data output type depends on the connection scheme of the cable attached to the connectors. BYTESEL (byteselect) lines to each of the output latches (pin 1) act as "enable" lines If all the BYTESEL lines are logic "low" , the output latches produce a parallel BCD-type data output. However, if the lines are logic "high" but enable (or go low) one at a time, the latch outputs go to the state determined during the previous clock edge and produce a byte-serial type data. Other signals produced at the Output Latches include RANGE and SIGN.

Refer to the timing diagram of FIG. 11. The OUT LATCH TRIGGER (OLT) signal at U5C-12 is generated by either an external triggering source or by an internal triggering source, depending on the position of triggering jumper J4. The rising edge of OLT, responsible for forcing the latches to sample the counter data, is synchronized to the rising edge of MCLK+. This action guarantees valid data since the counter data only changes on the falling edge of MCLK+. This same technique is also used for triggering the position feedback latches and the GPIB latches.

Position feedback latches U45, U28, U48, and U31 are used by the CPU to read the position for velocity calculations. These latches trigger by the TEDGE signal from the Encoder/Timing card, or by the start bit of a synchronizing byte from an 1886 position data processor.

The latch control circuitry for the position feedback latches produces a FBLCHTRG triggering signal from the Q output of U5A (pin 4). Latch U6D accepts the triggering signal from one of three sources: RXATRIG, RXBTRIG, or TEDGE (from Encoder/Timing assembly) at U42. The Encoder/Timing assembly provides the trigger for direct position inputs and the Serial Interface inputs. If the signal enters through the Position Inputs, the TEDGE signal is used by selecting INPUTITR. If the input signal enters through Serial Interface inputs, either RXATRIG or RXBTRIG is chosen depending on the input channel.

Latch U40 controls U42 to select the input trigger. STROBE (U42-7) causes the output at W (U42-6) to go "high". When the STROBE line is "low", the selected input goes to U6D. For example, if D1 is chosen, the strobe looks at the receiver RXATRIG signal which remains "high" until the trigger occurs. When the trigger condition happens, the line is pulled "low", the latch sets and remains set until cleared by a velocity update strobe (from U20-9). U5A toggles the Q output "high" on the next rising edge of MCLK, producing the FBLCHTRG signal within 200 nanoseconds. This signal clocks the feedback latches U45, U28, U48, U31, and U10 storing position for later use. Further triggers applied to U42 are ignored until the velocity update strobe occurs.

At the same time the position feedback latches are triggered, timers U21 and U20 are activated. When a trigger occurs, the timers begin counting. On completion of the timing cycle, the timers "strobe" latches U35, U18, and U2 through U22-C which transfers the new velocity data from U36, U19 and U3. This strobe also clears U6D and U5A so that subsequent triggers may be received.

GET position latches U44, U27, U47, and U30) provide an additional method of gathering position data for the controller by using the data bus. GET latches are triggered by a GPIB trigger signal originating from the CPU assembly. The GPIB latch control circuitry consists primarily of flipflops U6B and U5B. This stage is capable of sensing a trigger pulse for the GET latches (U44, U27, U47 and U30) and synchronizing the pulse with the clock so as not to latch data until the counter chain has stabilized. The GPIB latches are controlled by the GPIBLCHTR (latch trigger) signal from U5B, pin 5. As a GET signal is received, the bus interface hardware on the CPU assembly generates a "positive-going" pulse and sets the output of U6B. On the next positive edge of MCLK, U5B (pin 5) goes "high" which activates the GET latches. Data are held in these latches until the CPU reads the data and resets U6B (through latch U40) to accept the next trigger.

Over the serial link, a trigger signal activates the timers and triggers the position feedback latches. The remaining data enters over the serial link, the LPU reads the feedback latches, accepts and compares the data, calculates a new velocity, and writes the new velocity value to U36, U19 and U3. After the timers complete their sequence, they transfer the data all at once. This provides a constant time delay between when the trigger occurs and when the new velocity data reaches the latches.

Two types of triggering, internal and external, are available as selected by the position of jumper P4. For internal triggering, the jumper is installed forcing pin 3 of flipflop U6A "low". The output at pin 4 (Q) drives the OUT TRIG HOLD of U8 (pin 16). When this line is active, the OUT LATCH TOGGLE (pin 13) sets forcing the input of U5C (J) "high". This condition means the output toggles with the clock as shown in the timing diagram of FIG. 12. Under these conditions, the output data latches every 400 nanoseconds producing up-to-date data. If the INHIBIT line (pin 14) of U8 is pulled logic "low", the OUTPUT LATCH TOGGLE signal goes "low", and the output latches stop changing and remain in this present state. At this time, the output data are valid and will not change until the inhibit line goes high.

With external triggering, the jumper is not installed. The S2 input to U6A is always high, effectively disabling that input. The S1 input (EXTTRIG line) sets the flipflop. If triggering has not occurred recently, the OUTPUT LATCH TOGGLE (OLT) and OUTPUT TRIG HOLD (OTH) are zero. Output Q of U5C is low so that through inverter U22, the reset (R) input of U6A is high. An active low EXTTRIG— signal will then cause OTH (U6A-4) to be set. This causes OLT to set as long as INHIBIT— is not active. When OLT is set, the output latch trigger will occur on the next positive edge of MCLK. If an external trigger occurs during the time INHIBIT— is active, the output latches will not be updated until INHIBIT— becomes inactive.

The address decoding circuitry consists primarily of U39, U38, and U37. PAL U39 provides the address decoding for line FBS5, while all other lines are decoded through U38 and U37. U38 and U37 each have three address lines, A, B and C (SAMA0, SAMA1, and SAMA2). The SAMIO/M (I/O memory) line goes to GI (pin of U38 and U37, to enable them only during I/O operations and not during memory operations. The SAMWR (write) line goes to U37 while SAMRD (read) line goes to U38 of the G2A input (pin 4). The "Y" outputs of U38 occur during read operations to the latches, while the "Y" outputs of U37 occur during write operations to the latches. FBS5 is a read signal which comes directly from the PAL. Only three of the many I/O lines (SAMA0, SAMAI, and SAMA2) go to U38 and U37. Therefore, additional decoding is required. Higher order address lines (SAMA3, SAMA4/5, SAMA5/4, and SAMA6) go to U39 where it combines the data to give proper enable signals (for the correct address block). BDSEL (board select) signal comes from a PAL on the Encoder/Timing assembly, and decodes SAMA7 through SAMA19.

The "write" signals WR1 through WR8 at the output of U37, connect to U40, U23, U24, U3, U19, U36, U21 and U20 respectively. The "write" signals go into clock inputs (pin 13) of the latches which allow the microprocessor to send and latch data over the data bus.

The GPIB and FBS "read" signals at the output of U38 go to the Position Feedback latches and to the GET latches to enable the data in the latches to be read. FBS1 through FBS4 connect to position feedback latches while GPIBS1 through GPIBS4 connect to the GET latches. Read signals force the Output Control (OC, pin 1) pins of the control latches "low" to allow data to come onto the bus and be read by the microprocessor. When the microprocessor is not reading data, the OC lines are "high" with the output latches in a high impedance state.

U23 and U24 are the record increment counters. These two devices count the number of position increments which have occured and generate an interrupt through U39 and U6C to the microprocessor whenever the specified change in position is detected. These position increments are 0.0001 for BCD, and $\frac{1}{2}^{22}$ for binary position tracking cards. The record increment parameters (including size) must be specified through the GPIB (see Section 4.3.2).

U15D-11, whose inputs are RICOUNT and RICKEN, enables the counters to count, or disables the counters. RICKEN synchronizes starting and stopping the record increment function with the velocity update so that no increments are missed. RICOUNT determines which RAWCLOCK edges are to be counted and which are to be ignored. This process is controlled by PAL U8 (see Table 5).

The record increment counters form a 16-bit "up counter" whose maximum value is $2^{16}-1$. They are preset to the maximum value minus the number of increments to be counted by the microprocessor. The counters then count the number of increments which occur as position changes and therefore the amount which the positioner has moved. When the maximum value is reached, the programmed number of increments has occurred. At this point, the counters generate an interrupt and are automatically reloaded to their previous state to begin counting over the next interval. This assures that record increment interrupts happen precisely when the position counter chain reaches the angle desired for the record increment.

3.7 Front Panel Interface Assembly (A11)

3.7.1 Overview

Figure 13:
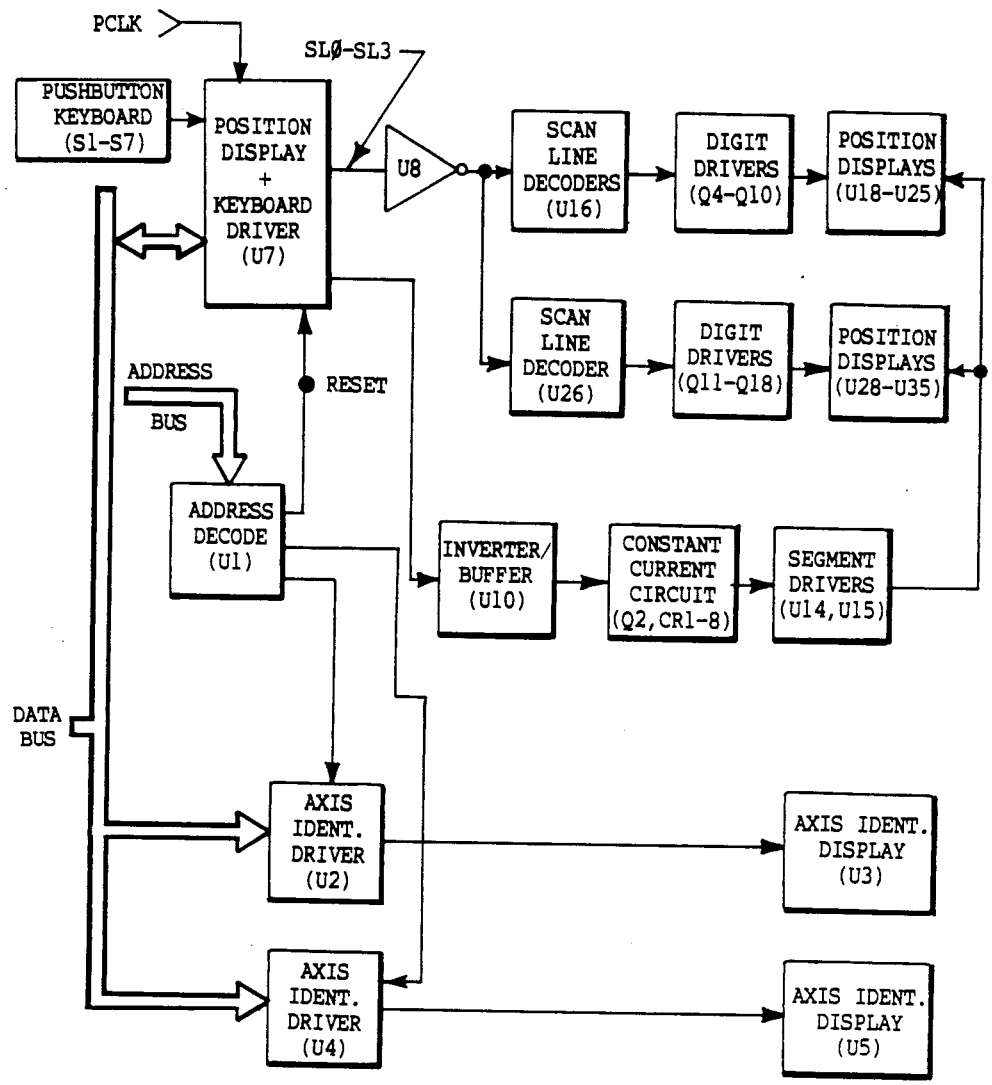
FIG. 13 is a block diagram of the front panel interface assembly of the assembly of FIG. 1.

In addition to the front panel displays and pushbutton keyboard panel, the Front Panel Interface assembly consists of the circuitry responsible for interfacing the same displays/keyboard to the CPU assembly. A block diagram of the Front Panel Interface assembly appears in FIG. 13.

The left and right front panel Position Displays each consist of a 7-segment, common cathode, LED display. A single driver integrated circuit drives both Position Displays and accepts commands from the pushbutton keyboard panel. The left and right Axis Identification front panel displays, however, each have a separate driver IC. All display drivers connect to the CPU through the data bus. Because of the keyboard interface of the Position display driver IC, two-way communication (or read/write) with the CPU is required whereas the Axis Identification display drivers only accept data from the CPU.

3.7.2 Detailed Discussion

The Position Output display and keyboard driver stage consists primarily of U7. U7, a programmable keyboard/display interface device, accepts and provides data and control signals for the CPU over the data bus. In addition, U7 multiplexes data for the display segment drivers (U14 and U15) and scans the keyboard pushbutton switches (S1 through S7) for any changes. A 2.5 MHz clock signal (PCLK) enters U7 at pin 3 and is divided into a 100 kHz scan rate for the front panel switches. After pressing any one of the front panel pushbuttons, a switch closure/release "code" is latched into U7 for reading by the CPU by way of the data bus.

Data for displaying enters U7 as seven-segment bit patterns. This data includes decimal digits, sign, and decimal locations for each LED assembly (U18 through U25, and U28 through U35). Data represents the bit pattern applied to the anodes of each LED. U7 sends anode data through the segment drivers while the cathode of the desired display enables. This procedure is repeated for each LED in a scanning fashion at a 100 kHz rate.

Scan Line output signals (SL0 through SL3) are inverted through U8 before being decoded by scan line decoders U16 and U26. On decoding the output from U7, U16 and U26 enable the selected cathode digit driver transistors Q3 through Q18. These transistors select one cathode from the bank of LED devices for conduction. Decoder U16 handles address data from 0 through 7 while decoder U26 handles 8 through 15.

Anode segment driver signals A0 through A3 and B0 through B3 at pins 24 through 31 of U7 are buffered and inverted through U10. Resistor network U11 acts as a pull-up line for U10 to maintain reverse bias on anode segment drivers U14 and U15. Resistor network U12 limits base current to U14 and U15. Emitter-follower Q2 and diodes CR1 through CR8 establish a constant base voltage for U14 and U15. This provides a constant current drive to anode segment LED's in the display devices for a more "even" lighting effect.

Two LED's, part of the DISPLAY and OUTPUT pushbuttons (S1 and S2), illuminate to provide visual verification for the operator of whether the "presently-active" selection is for a display or output. A third LED, CR9, acts as a REMOTE mode indicator, glowing when the unit operates with a system controller through the IEEE-488 bus.

The Axis Identification displays consist of eight-character, 14-segment, alphanumeric display devices U3 and U5 (FIG. 28). U2 and U4 drive U3 and U5 respectively. The CPU writes display data into specific RAM locations inside drivers U2 and U4, corresponding to specific characters on displays U3 and U5. The display data must be a code corresponding to one of the 64 characters contained in the dense ASCII subset (see Table 6). The driver decodes this data and sends an output signal consisting of the proper pattern to the display.

Like the Position displays, data are multiplexed by the drivers through a process of selecting one character at a time and providing segment data to the Axis Identification Displays.

Address data and I/O memory line data are decoded by single decoder, U1. However, the WRITE line (SAMWR—) does not go through U1, but rather feeds directly into the drivers.

Address lines A0, A1, and A2 go directly into U2 and U4. Address 0 indicates the writing of data for the leftmost character, while 7 indicates the writing for the rightmost character of each display.

U1 decodes the upper address lines to select one (or none) of the three drivers by activating chip select for the appropriate driver.

3.8 Rear Panel Interface Assembly (A12)

3.8.1 Overview

Figure 14:
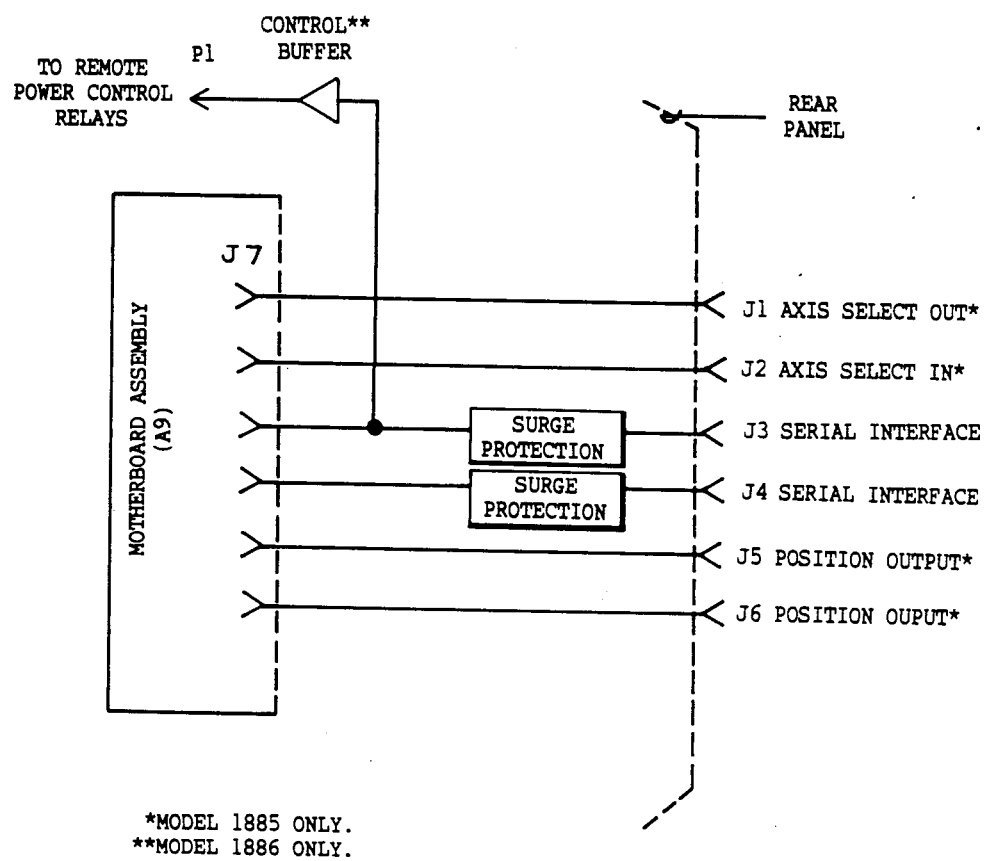
FIG. 14 is a block diagram of the rear panel interface assembly of the assembly of FIG. 1.

The Rear Panel Interface assembly, as its name implies, interfaces signals from the 1885 position indicator/1886 position data processor rear panel connectors to the appropriate internal circuitry. In addition, this assembly provides secondary surge protection for the rear panel Serial Interface connectors. A block diagram of the Rear Panel Interface assembly appears in FIG. 14.

3.8.2 Detailed Discussion

J1 and J2 are the Axis Select Output and Axis Select Input rear panel connectors, respectively, while J5 and J6 are the Position Output connectors. No signal conditioning is performed between the Motherboard assembly and these rear panel connectors.

The Rear Panel Interface assembly includes a secondary surge protection circuit for Serial Interface connectors J3 and J4 (against lightning for example). This protection circuit consists of back-to-back zener devices and resistor networks. These components are arranged in a configuration to "back-up" the primary protection device used over the serial interface link. This circuit is capable of absorbing relatively large current surges, but is not sufficient for primary protection.

The Remote Power Control Buffer (1886 position data processor only) allows the unit to be turned ON and OFF remotely, provided the power switch is in the "REMOTE" position. A switch on the Rear Panel Interface assembly determines which signal in the serial input will be used to drive the control buffer. If the 1886 position data processor is connected directly by way of a cable to the 1885 position indicator, the presence of a valid serial signal can be used to turn the unit ON. If a modem is involved in the link, the modem should be configured to indicate the detection of carrier on the CTS (Clear To Send) input to the 1886 position data processor, permitting the presence of carrier to drive the control buffer.

3.9 Powder Supply Assembly (A13)

3.9.1 Overview

Power Supply assembly A13 consists of a commercial unit from Standard Power, Inc., Model SWS 252 T-5/12/12.

The Model SWS 252 T provides the required source of both the 12V dc and +5V dc from either 115 v and 220 v ac, 50/60 Hz. The supply is constructed on a single chassis and mounted into the 1885 position indicator/1886 position data processor as assembly A2.

4. ENCODER PROCESSOR UNIT 4.1 Overview

The Encoder Processor unit provides the following functions:

o supplies appropriate excitation signal to a precision position encoder o amplifies and conditions low-level, high-accuracy position data signals from the output of a precision position encoder.

Figure 15A:
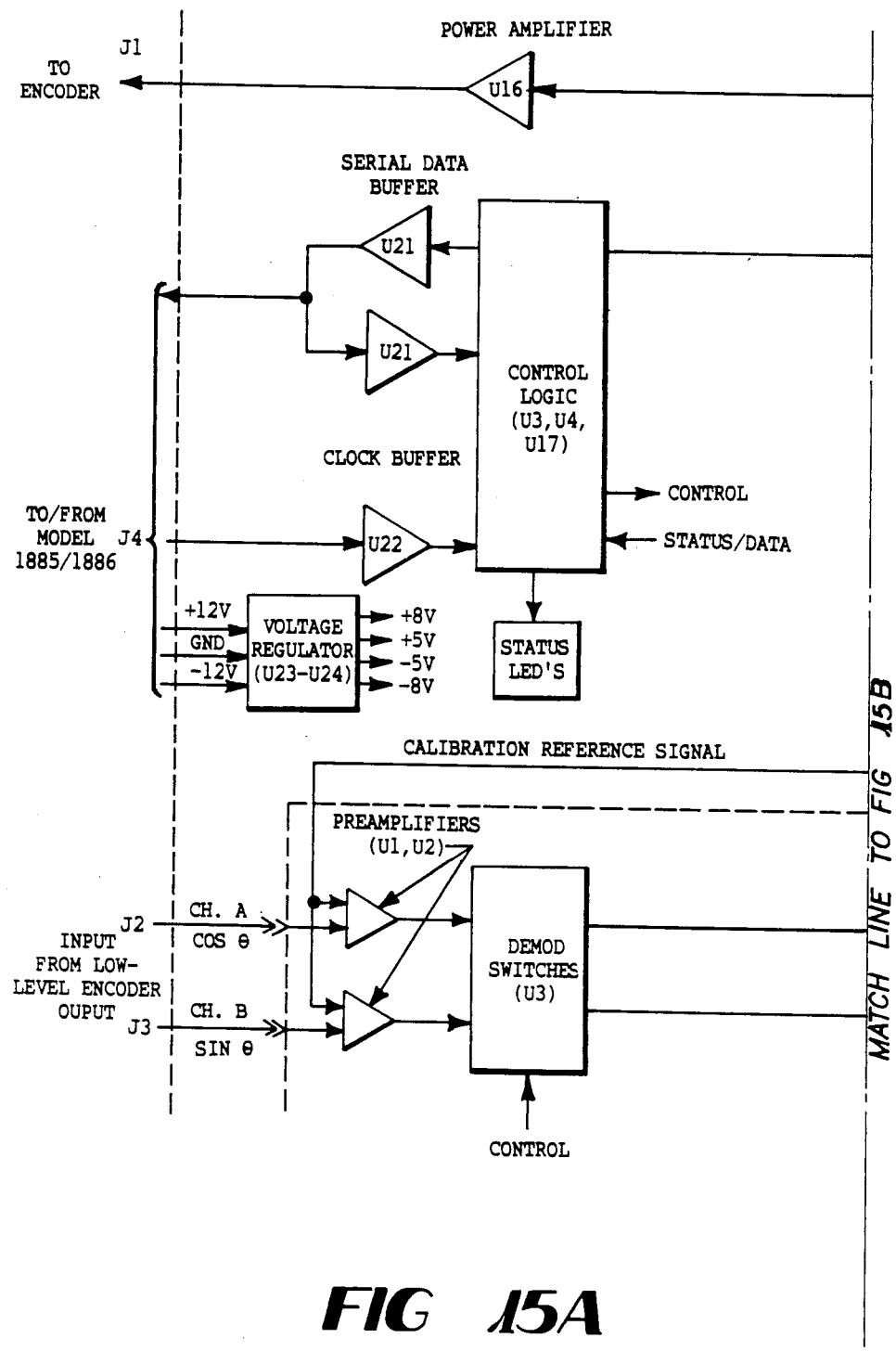
FIGS. 15A and 15B are a block diagram of the encoder processor assembly of the assembly of FIG. 1.
Figure 15B:
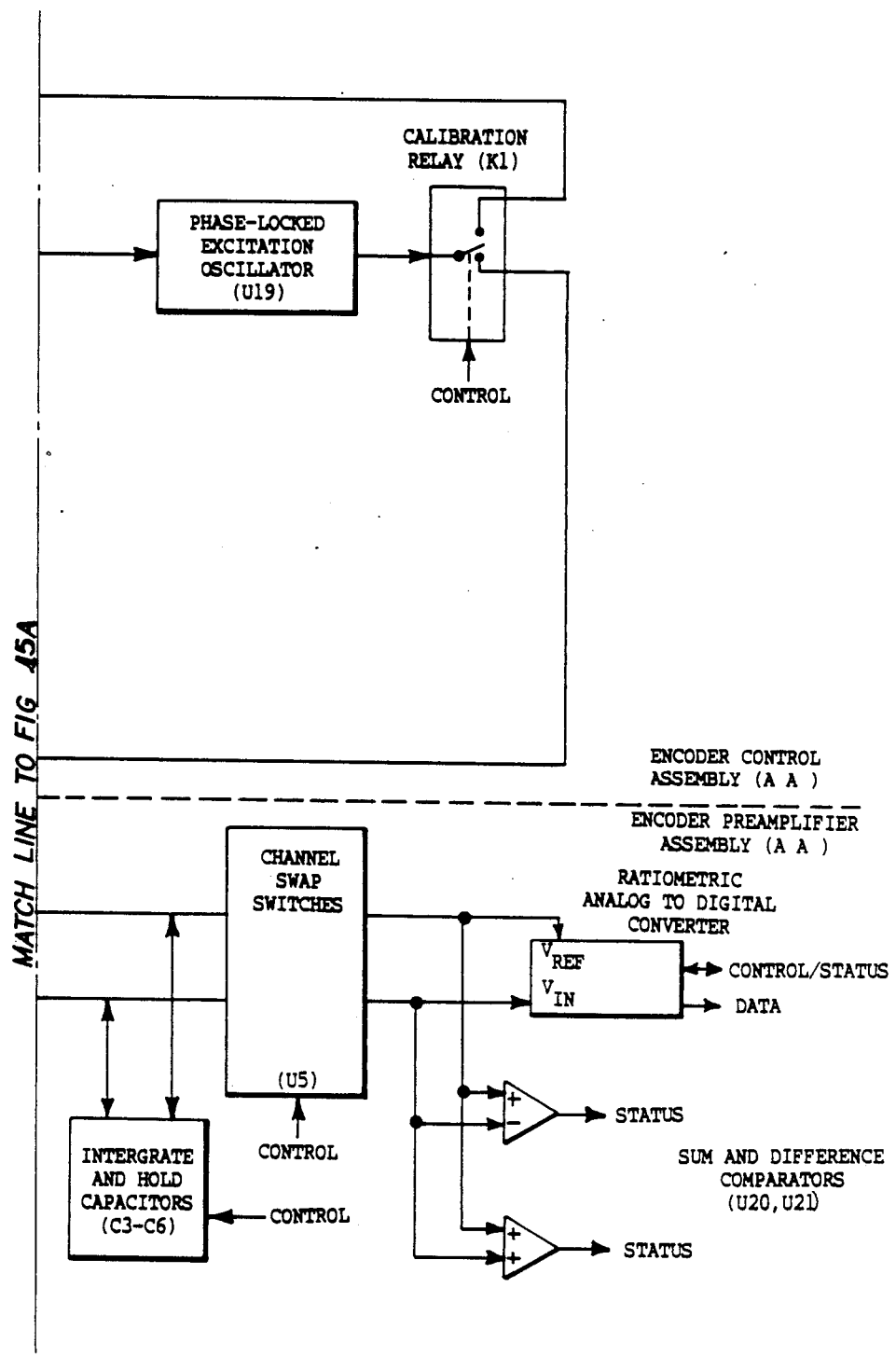

The Encoder Processor is designed for remote mounting inside the antenna positioner. Two individual assemblies, the Encoder Control and the Encoder Preamplifier, together form the Encoder Processor. A block diagram of the Encoder Processor assembly appears in FIG. 15.

The typical encoder used in Scientific-Atlanta positioning systems is an Inductosyn ® precision rotary transducer. The encoder windings require approximately a 6 v peak-to-peak, 10 kHz sine wave excitation signal. The dc voltage for producing the excitation signal originates in the 1885 position indicator/1886 position data processor and is sent to Encoder Processor through a downrange serial interface cable. A 10 kHz oscillator and amplifier on the Encoder Control assembly produce the proper excitation signal for the precision encoder.

The precision encoder provides two low-level output signals corresponding to position (sin and cos). Both output signals are amplified, demodulated, sampled, integrated, and converted to digital form.

During the conversion and sampling processes, the output data from the precision encoder are "ratiometrically" converted. This means the larger absolute value of the two signals, proportional to either sin or cos, becomes the reference voltage while the lower of the two signals is converted as a fraction of the reference voltage. The result, either sin/cos=tan or cos/sin=cotan $\phi$ (depending on which is less than 1), is digitally converted to a 13-bit tan or cotan and is transmitted serially uprange to the 1885 position indicator or 1886 position data processor Encoder/Timing assembly. The Encoder/Timing assembly accepts the data stream and performs the triggering process. Two additional bits of the data stream provide information to the 1885 position indicator/1886 position data processor. One bit indicates whether a tan or cotan value was generated. The other bit indicates the sign of sin $\phi$+cos $\phi$.

4.2 Detailed Discussion 4.2.1 Encoder Control Assembly (A1)

Data transfer between the Encoder Processor and the 1885 position indicator/1886 position data processor is over an RS-422-type serial link through connector J4 to U2. A 38.4 kHz clock signal from the 1885 position indicator/1886 position data processor Encoder/Timing assembly (A3) drives U1 to determine the data transfer rate.

The control circuitry consists primarily of PALs U3 and U4, and divide-by-four IC U5. U3 acts as a state machine with the main responsibility of controlling serial data and recognizing trigger pulses at U2. As U2 receives a trigger signal from the 1885 position indicator/1886 position data processor, the control circuitry forces an analog sample of the incoming data. The Encoder Preamplifier assembly performs an analog-to-digital conversion and sends the serial data stream back through the Encoder Control assembly to the 1885 position indicator/1886 position data processor for processing (the data are sent out by way of U2, a bidirectional device of the Encoder Control assembly).

U5 divides the clock input by 4 resulting in a synchronized signal for excitation oscillator, U6. U6, a phase-locked-loop (PLL) oscillator, generates the 10 kHz sine wave excitation signal for the precision encoder. U8 is an 8-watt power amplifier for driving the excitation signal. PALs U3 and U4 control the excitation oscillator as well.

Calibration relay, K1, switches the calibration signal injected at the input of the Encoder Preamplifier assembly ON and OFF. The excitation oscillator, U6, generates the calibration signal while U7 buffers the signal before it goes to the relay. While the calibration process takes place, the excitation signal is removed from the output connector (J1) by K1. The calibration sequence occurs periodically under commands from the 1885 position indicator/1886 position data processor.

The Encoder Control assembly also provides power supply voltage conditioning. 12 v enters through J4 from the 1885 position indicator/1886 position data processor and is regulated to 5 v and 8 v by U11, U12, U13, and U14.

On the edge of the Encoder Control assembly, a set of six red LEDs provide visual verification to the service technician of signal interface status to/from the Encoder Processor. This circuit monitors these functions:

1. operation (blinks to indicate conversions are taking place)

2. incoming serial bit stream 3. outgoing serial bit stream
4. the calibration function
5. integration and holding of the signal.
6. the swapping of channel A and B 4.2.2 Encoder Preamplifier Assembly (A2)

Input transformers match the impedance of the precision encoder with the higher impedance of the preamplifier circuitry. They also provide a voltage gain of about 50 dB. Resistors define the input impedance for the circuitry beyond the transformers. On the input side of the transformers, the impedance is 4 ohms. On the output side of the transformers, the impedance is 10K ohms. Two 1.8K precision resistors are used for injecting the calibration signal into the inputs of the transformers.

The low-level signals from the precision encoder (sin $\phi$ and cos $\phi$) are designated channel A and channel B in the block diagram. Operational amplifiers U1 and U2 amplify the signals from the transformers by a factor of 40. Demodulation is performed by U3, and C3 through C6. C3 through C6 are stable precision capacitors charged through matched resistors. Switch U3 selects one of the two pair of capacitors to be charged at a time synchronous with the excitation waveform. Each pair of capacitors corresponds to channel A and channel B input. Therefore, during the positive half-cycle of the sinewave C3 and C6 charge, while during the negative half-cycle C4 and C5 charge. This process produces a resultant complimentary-type output signal eliminating any dc offset voltages while also doubling the gain of the signals.

Switch U5 selectively reverses or "swaps" the two channels before they reach high input impedance amplifiers that serve to buffer the signals for further processing while also minimizing signal drop. Op amps form the sum and difference of the two channels, allowing additional op amps to determine the sign of A+B and A−B. This information is used by U3 and U4 to properly control the conversion process. For example, the signal with the larger absolute value must be used as the reference input to the ratiometric A-to-D converter. Also, if this reference voltage is negative, the converter feedback signal must be inverted. U3 makes these decisions.

A 12-bit digital-to-analog converter IC (a 7541 A IC), works with a COS successive approximation register IC (a 74C905 IC) to make successive "guesses" of the ratio of the reference voltage and signal voltage. These guesses are successively evaluated as the digital-to-analog converter IC accepts the guess value from the approximation register, and multiplies it by the reference voltage value. Hence, the output signal at the D/A converter is a product of the larger value of the two channels (the reference voltage), multiplied by an unknown value (the guess; always less than 1), and is compared with the smaller value of the two channels. For example, if channel A is equal to a value of 1 and channel B is equal to 0.5, channel A is considered the reference voltage because it is the larger of the two. The successive approximation register asks itself "what number times channel A would produce a value equal to B?", or:

$$A \times ? = B$$
$$? = B/A$$
$$? = .5/1$$
$$? = .5$$

The D/A converter uses a 13-bit binary search algorithm to calculate the final value. High performance amplifiers accurately evaluate the conversion process, providing serial data to U15 by way of PAL U4.

A listing in C language for applicant's position tracking algorithm and a netlist for the motherboard of the preferred embodiment are attached in microfiche form as microfiche pages 61–119.

We claim:

1. Apparatus for indicating the position of an antenna that is connected to angle-sensing transducer means which provide output signals relating to the position of the antenna,
   (a) input means for accepting, conditioning and ratiometrically converting the output signals from the transducer means into digital format;
   (b) a processor for:
      (i) accepting, for successive time intervals, digitized information from the input means relating to the position of the antenna;
      (ii) accepting, for successive time intervals, digitized information from an input/output means relating to the simulated position of the antenna; and
      (iii) calculating, for successive time intervals, tracking velocity information; and
   (c) input/output means for:
      (i) accepting, for successive time intervals, tracking velocity information from the processor;
      (ii) calculating, for successive time intervals, information relating to simulated values of the transducer means output; and
      (iii) providing the simulated values of the transducer means output to the processor and for providing output to indicate position of the antenna.

2. Position indicating apparatus according to claim in which the transducer means and conversion means comprise synchro-input means for accepting, conditioning and digitizing synchro analog position information and providing conditioned and digitized position information to the processor.

3. Position indicating apparatus according to claim in which the transducer means and conversion means comprise:
   (a) encoder processor means for accepting, conditioning and digitizing encoded information relating to the position of the antenna; and
   (b) encoder timing means for providing the conditioned and digitized information to the processor.

4. Position indicating apparatus according to claim 1 in which the transducer means and conversion means are located remotely from the remainder of the apparatus.

5. Apparatus for indicating the orientation of an antenna that is connected to angle-sensing transducer means which provide output signals relating to the position of the antenna, comprising:
   (a) input means for accepting, conditioning and ratiometrically converting to digital format the signals from the transducer means relating to position of the antenna;

(b) computing means for accepting the digital position information and utilizing it to calculate information relating to future position of the antenna;

(c) output means for utilizing the information relating to future position of the antenna to indicate such position; and (d) means for synchronizing trigger signals originating externally of the apparatus with internal timing signals of the apparatus.

6. Apparatus for indicating the position of an antenna that is connected to angle-sensing transducer means which provide output signals relating to the position of the antenna, (a) input means located remotely from the remainder of the apparatus for accepting, conditioning and ratiometrically converting to digital format information relating to position of the antenna;

(b) computing means for accepting the digital position information and utilizing it to calculate information relating to future position of the antenna; and (c) output means for utilizing the information relating to future position of the antenna and to indicate such position.

7. Apparatus for indicating the position of a device to which angle-sensing transducer means are connected, comprising:

(a) synchro-input means for accepting, conditioning and digitizing synchro analog information from the transducer means connected to the device and relating to the position of the device;

(b) encoder processor means for accepting, conditioning and digitizing encoded information from the transducer means connected to the device and relating to the position of the device;

(c) processor means for accepting:
(i) information relating to the position of the device from the synchro-input means and the encoder processor means; and
(ii) information relating to the simulated position of the device;
to calculate tracking velocity information according to the following formula:

$$V_{Tn, n+1} = \frac{P_n - P_{n-1}}{dt} - \frac{P_{sn} - P_n}{dt}$$

where:
$P_n$=information to the position of the device for a predetermined time interval;
$P_{n-1}$=information relating to the position of the device for the time interval immediately preceding the predetermined time interval;
$P_{sn}$=information relating to the simulated position of the device for the predetermined time interval;
dt=information relating to the length of the predetermined time interval; and
$V_{Tn,n+1}$=tracking velocity information calculated by the processor means for the time interval immediately following the predetermined time interval; and (d) input/out means for accepting the tracking velocity information from the processor means, calculating therefrom information relating to the simulated position of the device, and providing simulated position information to the processor means and for output.

8. Apparatus according to claim 7 in which the synchro-input means and the encoder processor means ratiometrically convert analog information relating to the position of the device to digital format.

9. Apparatus according to claim 7 in which the synchro-input means and encoder processor means are located remotely from the remainder of the apparatus.

10. A method for indicating the position of an antenna that is connected to angle-sensing transducer means, comprising the steps of:

(a) transducing in the transducer means information relating to the position of the antenna into electrical analog signals and providing the analog signals as transducer means output;

(b) converting the analog signals to digital signals;

(c) utilizing the digital signals to calculate tracking velocity and information relating to future value of the transducer means output; and (d) providing the information relating to future value of the transducer means output for output to indicate position of the antenna.

11. The method of claim 10 in which the step of converting the analog signals to digital signals comprises ratiometric conversion.

12. The method of claim 10 in which the steps of transducing information relating to the position of the device into electrical analog signals, providing the analog signals for transducer means output and converting the analog signals to digital signals are performed at a location remote from the location in which the remainder of the steps are performed.

13. A method for indicating the position of an antenna that is connected to angle-sensing transducer means, comprising the steps of:

(a) transducing, in the transducer means, information relating to the position of the antenna into analog electrical information and providing the analog electrical information as transducer means output;

(b) converting the analog electrical information to digital format;

(c) utilizing the digital formatted information, digital information relating to the simulated position of the antenna for a predetermined time increment and digital formatted information for the time increment immediately preceding the predetermined time increment to calculate tracking velocity information for the time increment immediately following the predetermined time increment;

(d) utilizing the tracking velocity information to:
(i) predict future values of the transducer means output; and
(ii) determine, for successive predetermined time increments, simulated position information for use in calculating tracking velocity information; and (e) providing for output the predicted future values of the transducer means output to indicate position of the antenna.

14. The method of claim 13 in which the step of converting the analog information to digital information comprises ratiometric conversion.

15. The method of claim 13 in which the steps of transducing information relating to the position of the device into analog electrical information, providing the analog electrical information as transducing means output and converting the analog electrical information to digital format are performed at a location remote from the location in which the remainder of the steps are performed.

* * * * *